US011121740B2

(12) United States Patent
Daga et al.

(10) Patent No.: US 11,121,740 B2
(45) Date of Patent: *Sep. 14, 2021

(54) NEAR FIELD, FULL DUPLEX DATA LINK FOR RESONANT INDUCTION WIRELESS CHARGING

(71) Applicant: Momentum Dynamics Corporation, Malvern, PA (US)

(72) Inventors: Andrew W. Daga, Malvern, PA (US); Francis J. McMahon, Malvern, PA (US); Edward J. Gander, Morton, PA (US); Matthew L. Ward, Exton, PA (US)

(73) Assignee: MOMENTUM DYNAMICS CORPORATION, Malvern, PA (US)

( * ) Notice: Subject to any disclaimer, the term of this patent is extended or adjusted under 35 U.S.C. 154(b) by 127 days.

This patent is subject to a terminal disclaimer.

(21) Appl. No.: 16/675,618

(22) Filed: Nov. 6, 2019

(65) Prior Publication Data

US 2020/0076474 A1     Mar. 5, 2020

Related U.S. Application Data

(63) Continuation-in-part of application No. 16/570,801, filed on Sep. 13, 2019, now Pat. No. 10,826,565, (Continued)

(51) Int. Cl.
*H04B 5/00* (2006.01)
*H01F 38/14* (2006.01)
(Continued)

(52) U.S. Cl.
CPC .......... *H04B 5/0031* (2013.01); *H01F 38/14* (2013.01); *H02J 7/025* (2013.01); *H02J 50/10* (2016.02);
(Continued)

(58) Field of Classification Search
CPC . H02J 50/80; H02J 50/10; H02J 7/025; H04B 5/0031; H04B 5/0037; H04B 5/0075; H01F 38/14
See application file for complete search history.

(56) References Cited

U.S. PATENT DOCUMENTS 5,302,954 A     4/1994 Brooks et al.
5,821,731 A *  10/1998 Kuki .................. B60L 53/31
                                                        320/108
(Continued)

FOREIGN PATENT DOCUMENTS

CN     101213783     7/2008
CN     102629775     8/2012
(Continued)

OTHER PUBLICATIONS

"U.S. Appl. No. 16/570,801, Notice of Allowance dated Jun. 30, 2020", 12 pgs.
(Continued)

*Primary Examiner* — Devan A Sandiford
(74) *Attorney, Agent, or Firm* — Culhane Meadows, PLLC

(57) ABSTRACT

A full duplex, low latency, near field data link controls a resonant induction, wireless power transfer system for recharging batteries. In an electric vehicle embodiment, an assembly is aligned with respect to a ground assembly to receive a charging signal. The vehicle assembly includes one or more charging coils and a first full duplex inductively coupled data communication system that communicates with a ground assembly including one or more charging coils and a second fill duplex inductively coupled data communications system. The charging coils of the ground assembly and the vehicle assembly are selectively enabled based on geometric positioning of the vehicle assembly relative to the ground assembly for charging. As appropriate, (Continued)

the transmit/receive system of the ground assembly and/or the vehicle assembly are adjusted to be of the same type to enable communication of charging management and control data between the ground assembly and the vehicle assembly during charging.

33 Claims, 14 Drawing Sheets

Related U.S. Application Data which is a continuation-in-part of application No. 16/158,978, filed on Oct. 12, 2018, now abandoned, which is a continuation of application No. 15/508,611, filed as application No. PCT/US2015/048521 on Sep. 4, 2015, now Pat. No. 10,135,496.

(60) Provisional application No. 62/046,392, filed on Sep. 5, 2014.

(51) Int. Cl.
*H02J 50/80* (2016.01)
*H02J 7/02* (2016.01)
*H04B 1/30* (2006.01)
*H02J 50/10* (2016.01)

(52) U.S. Cl.
CPC .............. *H02J 50/80* (2016.02); *H04B 1/30* (2013.01); *H04B 5/0037* (2013.01); *H04B 5/0075* (2013.01)

(56) References Cited

U.S. PATENT DOCUMENTS

| | | | | |
|---|---|---|---|---|
| 9,866,068 B2* | 1/2018 | Yamakawa | ............. | H02J 7/025 |
| 9,899,145 B2 | 2/2018 | Covic et al. | | |
| 10,135,496 B2 | 11/2018 | Long et al. | | |
| 2004/0036626 A1* | 2/2004 | Chan | ....................... | G01K 7/015 |
| | | | | 340/870.17 |
| 2010/0001712 A1* | 1/2010 | Royle | ....................... | G01V 3/08 |
| | | | | 324/67 |
| 2010/0052869 A1 | 3/2010 | Stewart | | |
| 2011/0193520 A1* | 8/2011 | Yamazaki | ................ | B60L 53/36 |
| | | | | 320/108 |
| 2011/0199028 A1* | 8/2011 | Yamazaki | ................ | H02J 7/025 |
| | | | | 318/139 |
| 2011/0248754 A1* | 10/2011 | Neumann | ................ | H03J 7/065 |
| | | | | 327/156 |
| 2011/0285349 A1* | 11/2011 | Widmer | ................... | H02J 50/10 |
| | | | | 320/108 |
| 2012/0001593 A1* | 1/2012 | Di Guardo | ............... | H04L 27/10 |
| | | | | 320/108 |
| 2012/0155344 A1* | 6/2012 | Wiley | ....................... | H02J 7/025 |
| | | | | 370/310 |
| 2013/0015707 A1 | 1/2013 | Redmann | | |
| 2013/0026849 A1* | 1/2013 | Ohta | ......................... | G06F 1/12 |
| | | | | 307/104 |
| 2013/0099584 A1 | 4/2013 | Von Novak, III | | |
| 2013/0154552 A1* | 6/2013 | Siessegger | ............ | H02J 7/0042 |
| | | | | 320/108 |
| 2015/0042168 A1* | 2/2015 | Widmer | ................ | B60L 53/305 |
| | | | | 307/104 |
| 2015/0084587 A1* | 3/2015 | Kato | ........................ | H02J 7/025 |
| | | | | 320/108 |
| 2015/0260835 A1* | 9/2015 | Widmer | ............... | H04B 5/0037 |
| | | | | 342/27 |
| 2017/0294941 A1 | 10/2017 | Long et al. | | |
| 2019/0207654 A1 | 7/2019 | Long et al. | | |
| 2020/0059266 A1* | 2/2020 | Daga | .................... | H04B 5/0031 |

FOREIGN PATENT DOCUMENTS

| | | |
|---|---|---|
| CN | 102947124 | 2/2013 |
| CN | 107112123 | 8/2017 |
| CN | 107112123 | 8/2018 |
| EP | 0681199 | 11/1995 |
| GB | 1166841 | 10/1969 |
| GB | 2497824 | 6/2013 |
| JP | 55058639 | 5/1980 |
| JP | H0264491 | 3/1990 |
| JP | 03501554 | 4/1991 |
| JP | 2010022183 | 1/2010 |
| JP | 2012-200085 A | 10/2012 |
| JP | 2013051744 | 3/2013 |
| JP | 2014-17934 A | 1/2014 |
| JP | 2017536068 | 11/2017 |
| JP | 6608116 | 11/2019 |
| JP | 2020080636 | 5/2020 |
| KR | 20010099714 | 11/2001 |
| WO | 2016037045 | 3/2016 |

OTHER PUBLICATIONS

"Korean Application Serial No. 10-2017-7009280, Notice of Preliminary Rejection dated Jul. 29, 2020", w English translation, 7 pgs.

"U.S. Appl. No. 16/570,801, Corrected Notice of Allowability dated Sep. 4, 2020", 2 pgs.

"Canadian Appiication Serial No. 2,960,196, Office Action dated Sep. 15, 2020", 5 pgs.

"European Application Serial No. 15838022.0, Response filed Feb. 27, 2020 to Communication Pursuant to Article 94(3) EPC dated Oct. 24, 2019", 17 pgs.

"International Application Serial No. PCT US2015 048521, International Search Report dated Jan. 29, 2016", 4 pgs.

"International Application Serial No. PCT US2015 048521, Written Opinion dated Jan. 29, 2016", 6 pgs.

"International Application Serial No. PCT US2015 048521, International Preliminary Report on Patentability dated Mar. 16, 2017", 8 pgs.

"International Application Serial No. PCT US2015 048521, Invitation to Pay Additional Fees dated Nov. 4, 2015", 2 pgs.

"U.S. Appl. No. 15/508,611, Preliminary Amendment dated Mar. 3, 2017", 3 pgs.

"European Office Action Serial No. 15838022.0, Response filed Oct. 20, 2017 to Office Action dated Apr. 12, 2017", 33 pgs.

"Chinese Application Serial No. 201580058034.9, Office Action dated Jan. 30, 2018", w English Translation, 10 pgs.

"Chinese Application Serial No. 201580058034.9, Response filed Mar. 20, 2018 to Office Action dated Jan. 30, 2018", w English Claims, w trans claims, 21 pgs.

"U.S. Appl. No. 15/508,611, Preliminary Amendment filed May 22, 2018", 13 pgs.

"U.S. Appl. No. 15/508,611, Notice of Allowance dated Jul. 13, 2018", 11 pgs.

"European Application Serial No. 15838022.0, Partial Supplementary European Search Report dated Jul. 24, 2018", 22 pgs.

"U.S. Appl. No. 15/508,611, Corrected Notice of Allowability dated Oct. 12, 2018", 5 pgs.

"European Application Serial No. 15838022.0, Extended European Search Report dated Nov. 7, 2018", 18 pgs.

"European Application Serial No. 15838022.0, Response filed May 20, 2019 to Extended European Search Report dated Nov. 7, 2018", 40 pgs.

"U.S. Appl. No. 16/158,978, Non Final Office Action dated Jun. 13, 2019", 9 pgs.

"Mexican Application Serial No. MX a 2017 002836, Office Action dated Mar. 6, 2019", w English Translation, 4 pgs.

"Japanese Application Serial No. 2017-512901, Office Action dated Jul. 23, 2019", w English translation, 8 pgs.

"Mexican Application Serial No. MX a 2017 002836, Response Filed Jul. 25, 2019 to Office Action dated Mar. 6, 2019", w English Claims, 28 pgs.

(56) References Cited

OTHER PUBLICATIONS

"European Application Serial No. 15838022.0, Communication Pursuant to Article 94(3) EPC dated Oct. 24, 2019", 16 pgs.
International Search Report and Written Opinion of the International Searching Authority for International Application No. PCT/US2020/050492, dated Dec. 10, 2020, 13 pages.
Japanese Office Action, "Notifce of Reasons for Refusal" for Japanese Patent Application No. 2019-167800, dated Nov. 13, 2020 (English Translation), 5 pages.

* cited by examiner

NEAR FIELD, FULL DUPLEX DATA LINK FOR RESONANT INDUCTION WIRELESS CHARGING

CROSS-REFERENCE TO RELATED APPLICATIONS

The present application is a continuation-in-part of U.S. patent application Ser. No. 16/570,801, filed Sep. 13, 2019, which is a continuation-in-part of U.S. patent application Ser. No. 16/158,978, filed Oct. 12, 2018, which is a continuation of U.S. patent application Ser. No. 15/508,611, filed Mar. 3, 2017, which is a U.S. National Stage Application filed under 35 U.S.C. 371 of International Application No. PCT/US2015/048521, filed Sep. 4, 2015, which claims priority to U.S. Provisional Patent Application No. 62/046,392, filed on Sep. 5, 2014. The contents of the referenced applications are hereby incorporated by reference.

TECHNICAL FIELD

A full duplex, near field data link intended for control of a resonant induction, wireless power transfer system is used for recharging electric vehicles. A coherent transponder configuration enables interference rejecting synchronous detection and positive rejection of signals originating from nearby and adjacent vehicles.

BACKGROUND inductive power transmission has many important applications spanning many industries and markets. Resonant induction wireless power apparatus may be viewed as a switch mode DC-to-DC power supply having a large air gap transformer separating and isolating the power supply input and output sections. Because the output current is controlled by adjustment of the input side parameters, there must be a way to communicate the output parameters to the input side control circuitry. Conventional, isolated, switch mode power supplies use optocouplers or coupling transformers to communicate across the isolation barrier but these conventional methods are not useful in the presence of a large physical gap. Acoustic and optical communications across the power transfer gap are possible in principle but are inadequate in practice when challenged by mud, road debris, snow and ice as well as standing water. It is possible to communicate across the power transfer gap by means of modulating the receiving inductor impedance and detecting the voltage and current variations induced on the primary side inductor. However, because of the generally low operating frequency employed by the resonant induction wireless power transfer apparatus and the moderate to high loaded Q of the primary and secondary side inductors of such resonant induction wireless power transfer systems, available data communications bandwidth is severely constrained and full duplex communications implementation is difficult.

Radio frequency-based data communications systems are therefore preferred as they are immune to the difficulties listed above; however, conventional radio frequency data communications systems are inadequate in several aspects. Half-duplex systems transmit only in one direction but rapidly alternate the direction of transmission, thereby creating a data link that functions as a full duplex link. Transmission data buffering or queueing introduces significant and variable transmission latency which is especially undesirable as a cause of control system instability when placed in the control system feedback path.

Conventional superheterodyne receivers generally require rather good intermediate frequency filters to provide off-channel interference rejection. However, such filters tend to be expensive and do not easily lend themselves to monolithic integration.

Furthermore, conventional radio data links do not intrinsically discriminate against other nearby data links of the same type. This means that conventional radio-based data links when employed to mediate wireless charging of electric vehicles often respond to the radio commands emitted by charging apparatus in nearby or adjacent parking slots, a behavior that greatly complicates unambiguous vehicle identification and subsequent wireless charging control.

SUMMARY

The systems and methods described herein address the above and other limitations of the prior art by implementing a coherent, full-duplex radio frequency data link that relies upon near field inductive coupling as opposed to far field propagation as in conventional systems to restrict effective communication range, that employs synchronous detection to reject off channel and some co-channel interference without sophisticated frequency domain filtering, and that employs a coherent transponder architecture for positive identification of data link transmission-reception equipment pairs.

In sample embodiments, two apparatuses are provided, one associated with the ground side wireless power transmission equipment, and another associated with the vehicle side wireless power reception equipment. A crystal-controlled reference oscillator located in the ground side apparatus provides a common basis for the coherent generation of all radio frequency signals needed for transmission and for detection. As this is a full duplex communication apparatus, there are two independent transmission-reception links: a forward link from the ground side to the vehicle side apparatus, and a return link from the vehicle side to the ground side apparatus. The vehicle side loop antennas are typically located below the conductive underbody of the vehicle and are parallel with respect to the ground surface.

The forward link transmission signal is derived from the reference oscillator. Serial data is imposed upon the forward link carrier by the modulator. Transmission occurs between two electrically small loop antennas having significant mutual induction coupling that are separated by much less than a wavelength at the forward link operating frequency. On the vehicle side of the forward link, the received signal is detected by a homodyne detector that extracts the carrier of the signal and uses it as a detection reference in a synchronous detector. The extracted carrier is multiplied in frequency and used as the carrier for the return link with the return link data imposed upon the carrier with a second modulator. Return link transmission occurs by near field, inductive coupling between two closely spaced, electrically small loop antennas as before. A synchronous detector on the ground side of the link extracts the return link data using a frequency multiplied version of the original reference oscillator signal as the detection reference. Link modulation in both directions may be amplitude modulation, phase modulation, or a combination of both.

Because the forward link carrier, the forward link detection reference, the return link carrier, and the return link detection reference are all derived from the same reference oscillator, coherency of these four critical signals is assured by design. Complex frequency acquisition and synchronization circuitry is not required. Furthermore, production tolerance and environmentally induced frequency variations between reference oscillators ensures that the link signals from apparatus located in adjacent parking spaces will not be coherent and therefore will not be subject to synchronous detection. Further rejection of link signals originating from apparatus and vehicles in adjacent parking slots arises from attenuation that results when the link transmission wavelength exceeds the vehicle underbody to ground surface separation distance with the vehicle underbody and the ground surface functioning as the two plates of a waveguide operating below the guide propagation cutoff frequency.

In accordance with a first aspect, a charging system is provided that includes a first coil assembly comprising a charging coil and a first full duplex inductively coupled data communications system comprising a first transmit/receive system that transmits a first signal over a first inductive link and receives a second signal over a second inductive link, and a second coil assembly comprising a charging coil and a second full duplex inductively coupled data communication system comprising a second transmit/receive system that receives the first signal over the first inductive link and transmits the second signal over the second inductive link. In sample embodiments, the first and second transmit/receive systems are adapted to be selectable among at least one of hardware, software, and firmware configurations that are adapted to modulate output signals and to demodulate input signals. Also, the charging coil of the first coil assembly is configured to be disposed in parallel to the charging coil of the second coil assembly to receive a charging signal during charging and is selectively enabled to match a geometry of the second coil assembly during charging.

In sample embodiments, the first transmit/receive system comprises a processor that processes data from at least one of the first coil assembly and external systems for transmission to the second coil assembly and processes data received from the second coil assembly for delivery to at least one of the first coil assembly and the external systems for processing. In the sample embodiments, when a failure event is detected by the first coil assembly or received from the second coil assembly, the processor disables the charging signal.

In other sample embodiments, the second transmit/receive system comprises a processor that processes at least one of commands and data from the second coil assembly and from external systems for transmission to the first coil assembly and processes data received from the first coil assembly for delivery to the second coil assembly and at least one of the external systems. In the sample embodiments, the second coil assembly further comprises a digital interface and the processor provides measurements related to the first signal, the second signal, and the charging signal to the digital interface. The measurements include at least one of signal strength, bit-error-rate, ratio of Energy per Bit to a Spectral Noise Density, frequency, and amplitude and phase shift at first and second antenna structures of the first coil assembly and second coil assembly. In the sample embodiments, the external systems may comprise an external processor. In such embodiments, the measurements are delivered via the digital interface to the external processor for at least one of alignment detection and closed loop charging system management and control. The external processor may provide near real-time voltage and current measurements on the second coil assembly, thermal measurements of the second coil assembly, Z-gap changes, first coil assembly or second coil assembly failure alerts, alerts regarding mid-charging performance events, and additional sensing data related to the second coil assembly to the processor for transmission.

In other sample embodiments, the first signal and the second signal are configured as either narrowband or wideband signals depending on a stage of a charging cycle or whether a threshold of signal quality has been crossed.

In still other sample embodiments, the first signal and the second signal are configured as an asynchronous spread spectrum signal. In such embodiments, the first and second transmit/receive systems each may comprise a direct sequence spread spectrum system that transmits complementary code sequences that allow for the first and second transmit/receive systems to distinguish between signals and co-channel interference.

In sample embodiments, the hardware, software, and/or firmware are adapted to modulate the output signals using at least two of amplitude modulation, phase modulation, frequency modulation, Orthogonal Frequency Division Multiplexing (OFDM), and spread spectrum techniques. The spread spectrum techniques may comprise at least one of direct sequence spread spectrum, Chirp Spread Spectrum (CSS), binary orthogonal keying (BOK), and frequency hopping.

In still further sample embodiments, the first and second transmit/receive systems each comprises a receiver, an analog to digital converter, a digital processor that processes data from at least one of the first coil assembly and external systems for transmission to the second coil assembly and processes data received from the second coil assembly for delivery to at least one of the first coil assembly and the external systems for processing, a digital to analog converter, and a transmitter. In the sample embodiments, the analog to digital converter and digital to analog converter are implemented as discrete integrated circuits and the digital processor is implemented as a field programmable gate array. Also, the analog to digital converter, digital processor, and digital to analog converter may be implemented as firmware residing in an application-specific-integrated-circuit (ASIC). In the sample embodiments, the digital processor of each transmit/receive system processes input data for transmission and processes data received from the other transmit/receive system using software structures implemented on the digital processor. The first and second transmit receive systems may optionally include at least one bandpass filter.

In accordance with a second aspect, a method of charging a vehicle is provided that includes positioning a vehicle assembly with respect to a ground assembly so as to receive a charging signal, the vehicle assembly, comprising one or more charging coils, with each charging coil having a first full duplex inductively coupled data communication system comprising a first transmit/receive system that receives a first signal over a first inductive link and transmits a second signal over a second inductive link, and the ground assembly comprising one or more charging coils, with each charging coil having a second full duplex inductively coupled data communications system comprising a second transmit/receive system that transmits the first signal over the first inductive link and receives the second signal over the second inductive link. The charging coils of the ground assembly and the vehicle assembly are selectively enabled based on geometric positioning of the vehicle assembly relative to the ground assembly for charging. At least one of the first transmit/receive system and the second transmit/receive system are selected to have a same type of hardware, software, and/or firmware adapted to modulate output signals and to demodulate input signals in a same manner as the other of the first and second transmit/receive systems. Charging management and control data are communicated between the first and second transmit/receive systems over the first and second inductive links during charging.

In sample embodiments, the first transmit/receive system and the second transmit/receive system are adapted to modulate the output signals using at least two of amplitude modulation, phase modulation, frequency modulation, Orthogonal Frequency Division Multiplexing (OFDM), and spread spectrum techniques. The spread spectrum techniques may include at least one of direct sequence spread spectrum, Chirp Spread Spectrum (CSS), binary orthogonal keying (BOK), and frequency hopping.

In other sample embodiments, at least one of software updates, diagnostic or telemetry information, and passenger entertainment services data are communicated between the ground assembly and the vehicle assembly via the first and second inductive links during charging. The charging signal may be disabled when a failure event is detected by the ground assembly or received from the vehicle assembly.

In other sample embodiments, the first transmit/receive system processes at least one of commands and data from the vehicle assembly and from external systems for transmission to the ground assembly and processes data received from the ground assembly for delivery to the vehicle assembly and at least one of the external systems. Measurements related to the first signal, the second signal, and the charging signal also may be provided to a digital interface for processing. The measurements may include at least one of signal strength, ratio of Energy per Bit to a Spectral Noise Density, frequency, and amplitude and phase shift at first and second antenna structures of the vehicle assembly and ground assembly. The measurements may be delivered via the digital interface to an external processor for at least one of alignment detection and closed loop charging system management and control.

In yet other sample embodiments, the method includes transmitting at least one of near real-time voltage and current measurements on the vehicle assembly, thermal measurements of the vehicle assembly, Z-gap changes due to loading or unloading of a vehicle containing the vehicle assembly, ground assembly or vehicle assembly failure alerts, alerts regarding mid-charging performance events, and additional sensing data related to the vehicle assembly from the vehicle assembly to the ground assembly.

In still further sample embodiments, the method includes configuring the first signal and the second signal as either narrowband or wideband signals depending on a stage of a charging cycle or whether a threshold of signal quality has been crossed.

In yet further sample embodiments, the method includes configuring the first signal and the second signal as an asynchronous spread spectrum signal. Complementary code sequences may be transmitted between the first and second transmit/receive systems that allow for the first and second transmit/receive systems to distinguish between signals and co-channel interference.

In accordance with a third aspect, a vehicle charging system is provided that includes a clustered ground assembly comprising at least two independent coils, each coil having a first full duplex inductively coupled data communications system comprising a transmit/receive system that transmits a first signal over a first inductive link and receives a second signal from a vehicle over a second inductive link, the first and second signals being communicated between the clustered ground assembly and the vehicle assembly during charging of the vehicle. The clustered ground assembly may include individual ground assemblies installed in a tight, contiguous fashion to form a single, macro ground assembly.

In sample embodiments, the vehicle being charged has two or more vehicle assemblies mounted to allow higher power transfer than may be achieved with a single vehicle assembly and the clustered ground assembly, includes coils configured to match a geometry of the two or more vehicle assemblies.

In further sample embodiments, the vehicle being charged may be equipped with a clustered vehicle assembly in a matching geometry to the clustered ground assembly. The clustered vehicle assembly may comprise at least two independent coils, each coil having a second full duplex inductively coupled data communications system comprising a transmit/receive system that transmits the second signal over second inductive link and receives the first signal from the clustered ground assembly over the first inductive link, the first and second signals being communicated between the clustered ground assembly and the clustered vehicle assembly during charging of the vehicle.

The clustered vehicle assembly and the clustered ground assembly may each include two or more functionally identical assemblies, each functionally identical assembly including a magnetic induction antenna and a common resonant induction coil unit.

DETAILED DESCRIPTION OF THE DRAWINGS

The foregoing and other beneficial features and advantages of the invention will become apparent from the following detailed description in connection with the attached figures, of which:

DETAILED DESCRIPTION OF ILLUSTRATIVE EMBODIMENTS

Sample embodiments will be described with respect to FIGS. 1-14 for use in charging electrically powered vehicles, although those skilled in the art will appreciate that the teachings provided herein may be used in other non-vehicular resonant magnetic induction wireless power transfer systems. Such embodiments are intended to be within the scope of the present disclosure.

Figure 1:
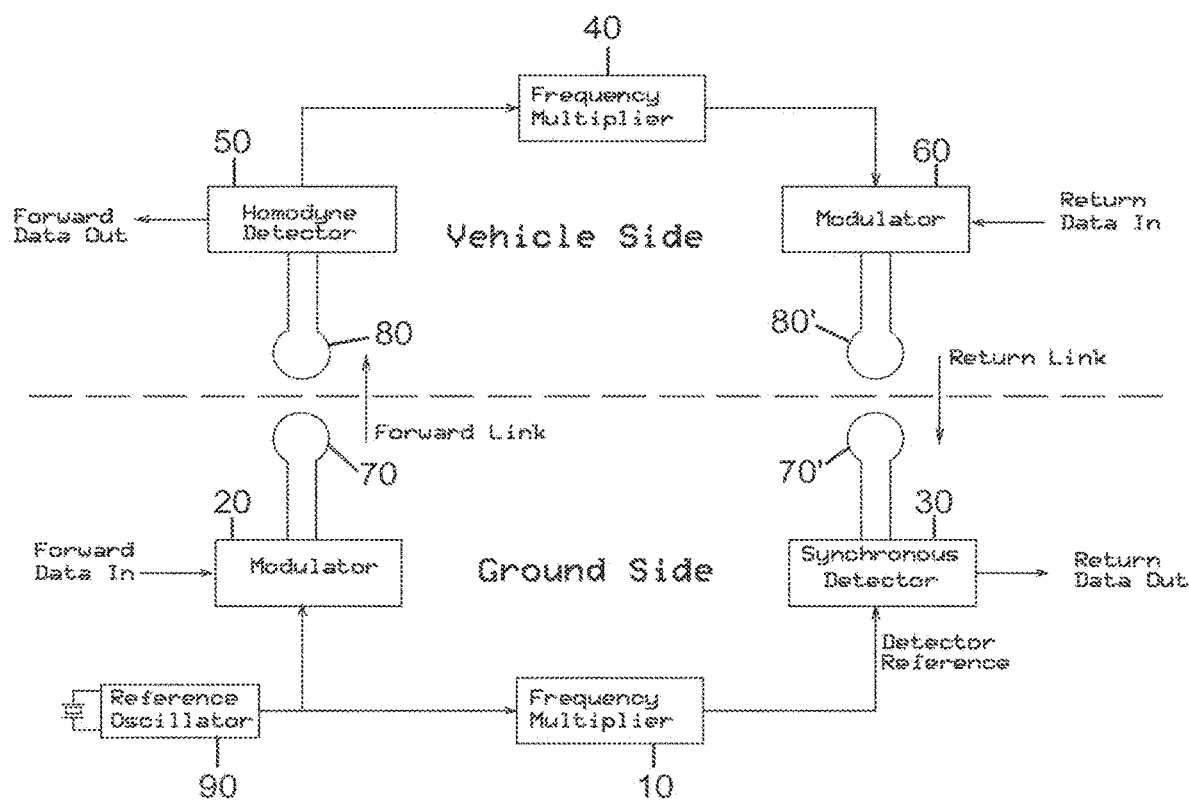
FIG. 1 shows a conceptual representation of sample embodiments of ground side and vehicle side transmission equipment.

FIG. 1 illustrates a conceptual representation of sample embodiments where two apparatuses are provided, a ground side apparatus associated with the ground side wireless power transmission equipment, and a vehicle side apparatus associated with the vehicle side wireless power reception equipment. The data link illustrated in FIG. 1 may, for example, be implemented in the coil alignment error detecting apparatus described in U.S. Pat. No. 10,193,400. As shown in FIG. 1, the ground side apparatus includes a frequency multiplier 10, a data modulator 20 that receives input data for transmission, and a synchronous detector 30 that receives data on a return link from the vehicle side apparatus and provides output data. Similarly, the vehicle side apparatus includes a frequency multiplier 40, a homodyne detector 50 that receives data on a forward link from the ground side apparatus, and a modulator 60 that transmits data on the return link to the ground side apparatus. Loop antennas 70 and 70' of the ground side apparatus communicate wirelessly by induction with loop antennas 80 and 80' on the vehicle side apparatus in a conventional manner. A crystal controlled reference oscillator 90 located in the ground side apparatus provides a common basis for the coherent generation of all radio frequency signals needed for transmission and for detection. As this is a full duplex communication apparatus, there are two independent transmission-reception links: a forward link from the ground side to the vehicle side apparatus, and a return link from the vehicle side to the ground side apparatus. The vehicle side loop antennas 80 and 80' are typically located below the conductive underbody of the vehicle and are parallel with respect to the ground side loop antennas 70 and 70'.

The systems and methods described herein and shown in FIG. 1 depart from conventional radio data communications as follows:

The communications path is full duplex and bi-directional having a forward path from the ground side apparatus to the vehicle side apparatus and a second return data path originating with the vehicle side apparatus sending data to the ground side apparatus.

The electronic communication mechanism is near field, magnetic field coupling between two antennas 70, 80 and 70', 80' sensitive to impinging magnetic field energy, rather than far field, free space propagation of conventional practice radio frequency data communications.

The forward path signal carrier provides the basis for the generation of the secondary path signal by means of frequency multiplication. This means that the secondary path signal is harmonically related to the forward path signal and the technical difficulty of deriving a synchronous and coherent reference signal for return path synchronous detection is avoided. Furthermore, the coherent, harmonically related forward, return path signals make possible simple, unambiguous rejection of co-channel and off channel-interference and rejection of data link signals originating from other identical apparatus in adjacent parking slots.

Figure 2:
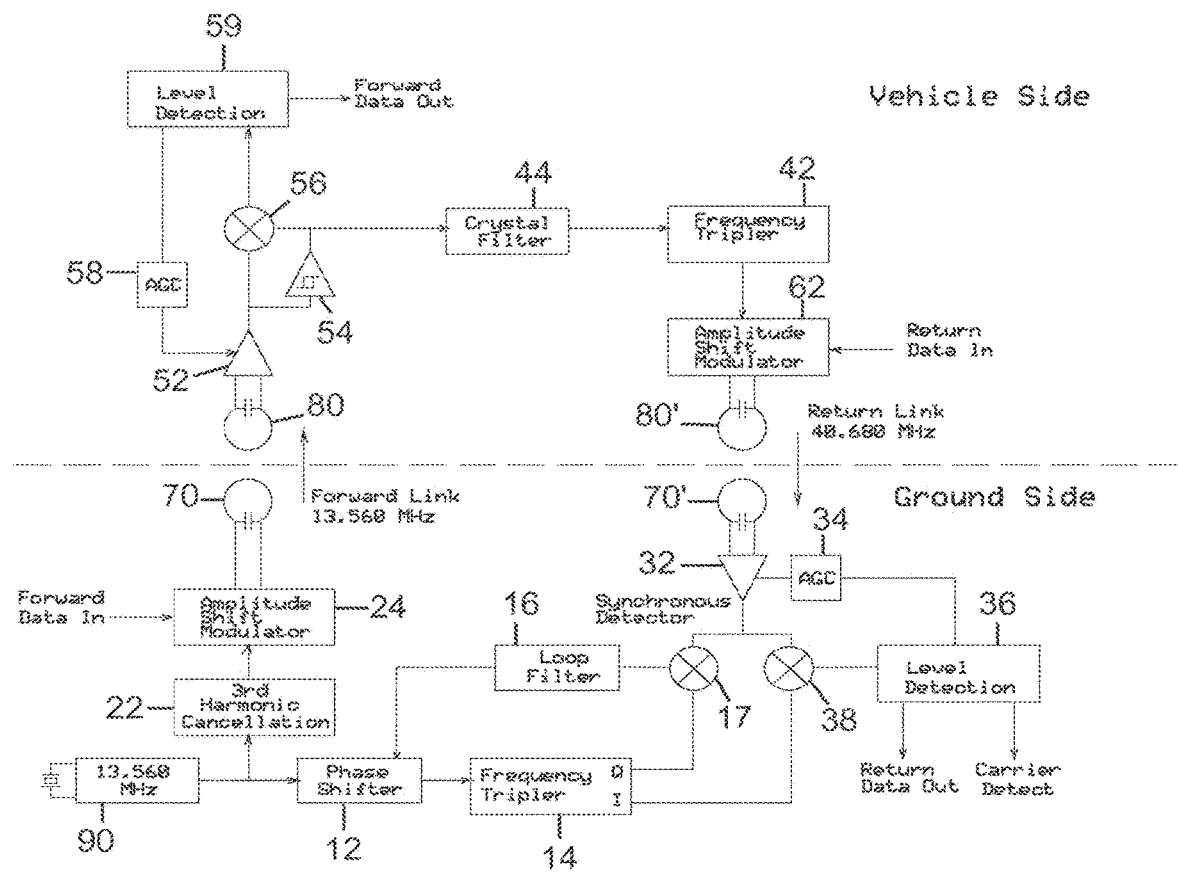
FIG. 2 shows a sample embodiment of a full-duplex radio frequency data link.

In the exemplary embodiment shown in FIG. 2, the forward path frequency from reference oscillator 90 is 13.560 MHz. The return path operates on the third harmonic of the forward path, 40.680 MHz. Both frequencies are internationally allocated for non-communications Industrial, Scientific and Medical (ISM) use. Communications use is also permitted in ISM channels with reduced regulatory requirements but interference is accepted from all other ISM channel users. The non-radiating, near field nature of the coherent transponder system described herein along with the waveguide below cutoff structure comprised by the vehicle conductive underbody and the ground surface in a typical application makes the described system very tolerant of co-channel interference and for this reason is well suited for use on ISM assigned frequencies.

The forward path signal generation begins with reference quartz crystal oscillator 90 operating at a frequency of 13.560 MHz. This signal is applied to a waveform generation stage including $3^{rd}$ harmonic cancellation circuit 22 and amplitude shift modulator 24 that together comprise the modulator 20 of FIG. 1. Of course, other types of modulators, such as frequency shift modulators, QPSK modulators, and the like may be used. In the exemplary embodiment, amplitude shift modulator 24 generates the rectangular waveform shown in FIG. 3 where T is the waveform period and the 3rd harmonic power is approximately zero. A small loop antenna 70 with a balanced feed serves as the forward path transmit antenna, while a second, vehicle mounted, balanced feed, small loop antenna 80 is used for the forward path receive antenna. Both antennas 70, 80 are much smaller than a wavelength at the operating frequency and for this reason are poor free-space radiators. However, when in close physical proximity, the two small loop antennas 70, 80 have significant mutual magnetic field coupling that enables both forward and reverse communications paths without significant free space propagation.

Figure 3:
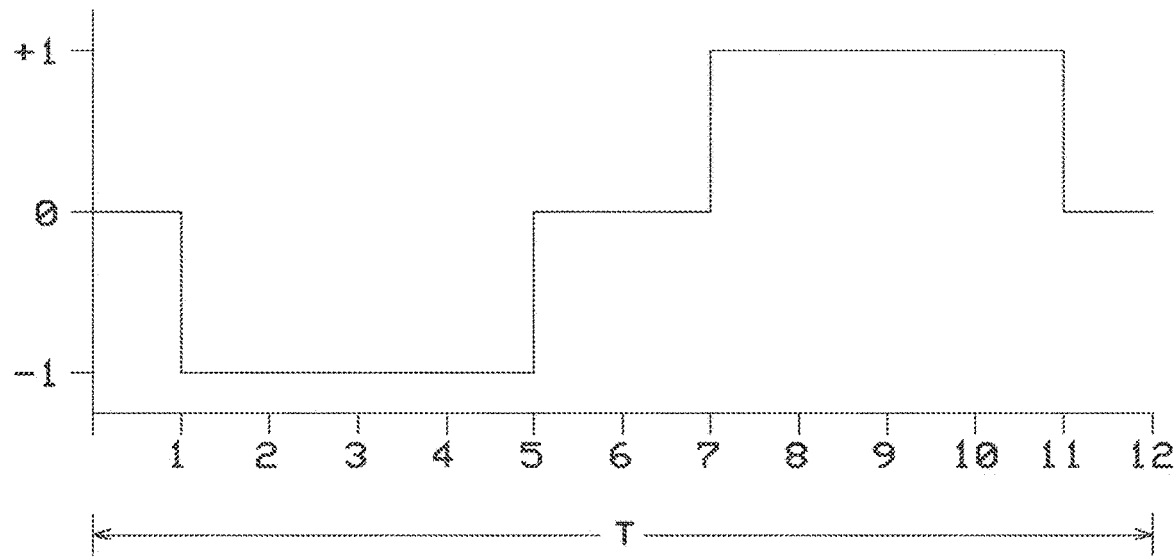
FIG. 3 shows the low harmonic waveform employed by the sample embodiment of FIG. 2 to avoid self-interference.
Figure 4:
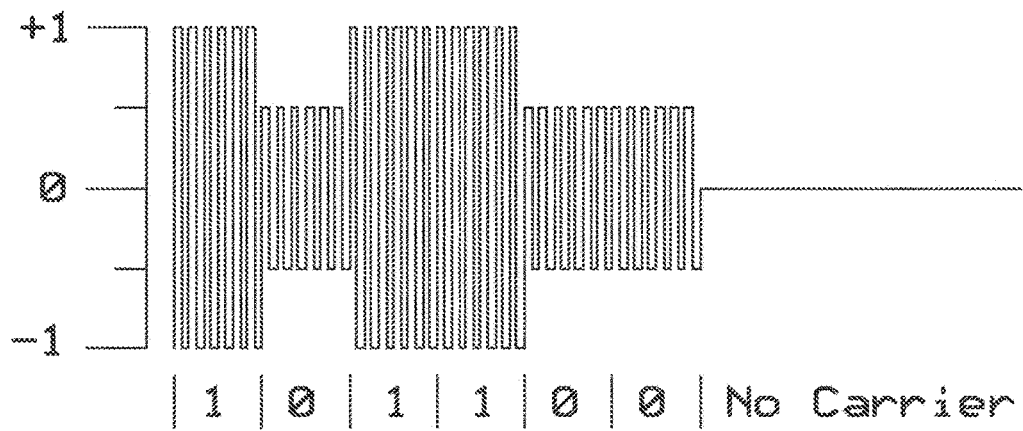
FIG. 4 shows a representation of digital amplitude shift modulation used by the sample embodiment of FIG. 2.

From the "Engineering Mathematics Handbook, Third Edition, Tuma, Jan J., McGraw-Hill 1987 ISBN 0-07-065443-3, the Fourier series coefficients for the modified sine waveform shown in FIG. 3 are given by:

$$\beta_n = \frac{4\mathrm{Sin}\frac{n}{3}\pi \mathrm{Sin}\frac{n}{2}\pi}{n\pi}$$

Of the first twenty Fourier series coefficients, all but six are zero. The non-zero coefficients are the $5^{th}$ and $7^{th}$, which are suppressed −14 dB and −16.9 dB, the $11^{th}$ and $13^{th}$ which are suppressed −20.8 dB and −22.3 dB, and the $17^{th}$ and $19^{th}$ which are suppressed −22.9 and −25.5 dB with respect to the desired n=1 component. While a mathematically ideal waveform has infinite third harmonic suppression, a practical implementation will have less than infinite harmonic cancellation due to non-equal 0-1 and 1-0 logic propagation delays and from other small waveform asymmetries. Even so, the waveform of FIG. 3 generated by the $3^{rd}$ harmonic cancellation circuit 22 with the circuit shown in FIG. 5 has excellent third harmonic suppression ($3^{rd}$ harmonic energy approaching zero), a highly desirable feature to avoid self-interference between the third harmonic of the forward transmission path and detection of the 40.680 MHz return path. Remaining residual third harmonic energy may be further suppressed, if necessary, using conventional harmonic filtering techniques.

Figure 5:
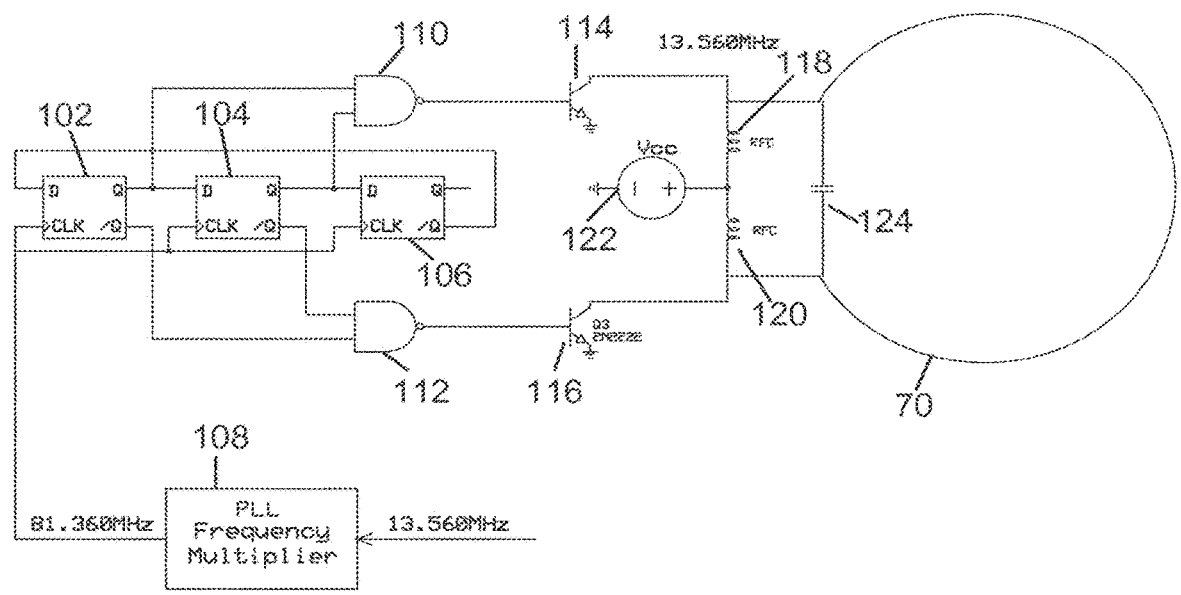
FIG. 5 shows an embodiment of the low harmonic generation circuit that produces the waveform shown in FIG. 3.

The low third harmonic generation circuit shown in FIG. 5 consists of a walking ring counter comprised of three D flip-flops 102, 104, 106 clocked at six times the desired output frequency as derived from the 13.560 MHz frequency from the reference oscillator 90 by PLL frequency multiplier 108. A pair of NAND gates 110, 112 decodes the walking ring counter to produce the desired rectangular wave that drives the forward link loop antenna 70 by means of two transistors 114, 116 arranged in a symmetrical, push-pull configuration. The inductance of the two radio frequency chokes 118, 120 connected to voltage source 122, combined with the inductance of the loop antenna 70 and the antenna resonating capacitor 124 shown in FIG. 5, constitute a resonant circuit that provides suppression of residual harmonic energy, particularly third harmonics in the illustrated embodiment.

As shown in FIG. 2, in an exemplary embodiment amplitude shift keying (ASK) modulation is imposed upon the forward link carrier by amplitude shift modulator 24 by varying the value of the forward link transmitting stage supply voltage. Logic one bits are encoded as full signal amplitude with the transmitting stage operating from full supply voltage. Logic zero bits are encoded as one half of the full signal amplitude with the transmitting stage operating with a reduced supply voltage. Varying the transmitter stage supply voltage in this fashion produces the transmission waveform shown in FIG. 4.

On the vehicle side of the forward link, a variable gain controlled amplifier 52 increases received signal amplitude from loop antenna 80. Since the received signal has non-zero values even for logic zero bits, the 13.56 MHz carrier is always present (see FIG. 4). A portion of the amplified, received signal is applied to a limiting amplifier 54 that removes received signal amplitude variations, both those introduced by amplitude data modulation and those occurring due to incidental changes in the magnetic field coupling between the two forward path loop antennas 70, 80. The output of the limiting amplifier 54 is a constant amplitude square wave that indicates the instantaneous polarity of the received signal. The portion of the variable gain amplifier output not applied to the limiting amplifier 54 is applied to one input of the multiplicative mixer 56. The limiting amplifier 54 output drives the other mixer input. The limiting amplifier 54 and the mixer 56 comprise the homodyne detector 50 in which the incoming signal carrier is extracted and used to synchronously detect the incoming signal. The propagation delay of the limiting amplifier 54 is negligible or compensated for to achieve the full advantages of coherent detection. The output of the homodyne detector 50 is equivalent to full wave rectification of the incoming amplitude modulated signal. Resistor-capacitor low pass filtering removes the twice carrier frequency ripple leaving a direct current voltage that varies amplitude according to the impressed serial digital modulation. The carrier ripple filtered, post-homodyne detector signal is applied to a level detection circuit 59 that feeds the automatic gain control (AGC) control loop 58 and that also extracts the forward path serial data by means of amplitude level detection. Its implementation will be described in greater detail below with respect to FIG. 7.

The forward path carrier recovered by the limiting amplifier 54 is applied to a frequency tripler 42 implemented as a pulse generator followed by a filter or equivalently by a phase locked loop after first having passed through a crystal filter 44 that prohibits frequency multiplier operation except in the presence of a sufficiently strong forward link signal, thus avoiding conflicting frequencies. The resulting 40.680 MHz carrier is applied to a second amplitude shift modulator 62 using 100% and 50% modulations levels as before to encode serial, digital data on the return data path. The return path amplitude shift modulator 62 drives a small, resonant loop antenna 80' as before except that elements 102-112 of FIG. 5 are not needed.

Figure 6:
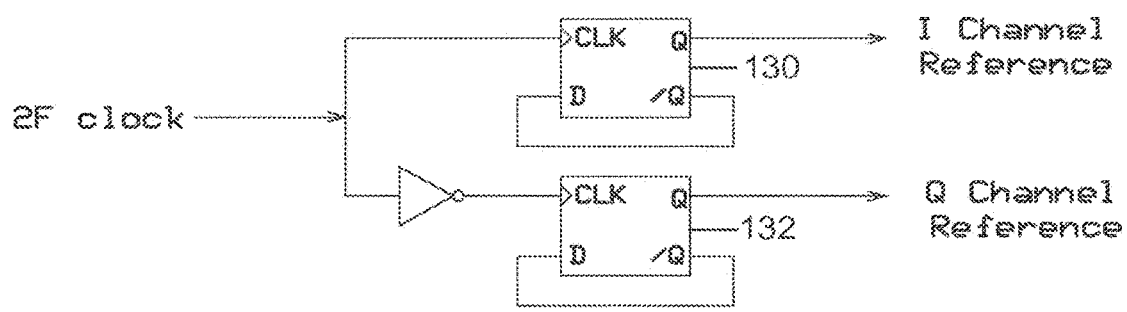
FIG. 6 shows a representation of digital amplitude shift modulation used by the embodiment of FIG. 2.

On the ground side of the return link, there is a small resonant loop receiving antenna 70' and an amplifier 32 controlled by automatic gain control (AGC) circuit 34. Synchronous detection of the received return path signal is implemented by generating a 40.680 MHz synchronous detection reference signal by means of frequency tripling. While the frequency error of the synchronous detection reference signal is guaranteed to be zero by the overall design of the apparatus, zero phase error is not assured and is obtained through the use of quadrature channel phase detection and phase lock loop control of a phase shifter stage. Putting the phase shift stage (phase shifter 12) before rather than after frequency tripler 14 means total phase shift control range need only exceed 120 degrees rather than the full 360 degrees required at the synchronous detector 30 to insure phase synchronous detection. To ease the quadrature reference signal generation at 40.680 MHz, the ground side 13.560 MHz signal from the crystal oscillator 90 is multiplied by frequency tripler 14 which outputs two square waves offset by 90°. The frequency tripler 14 is implemented by a factor of six phase locked loop frequency multiplier followed by a quadrature divide by two circuit as shown in FIG. 6 including D flip-flops 130, 132 to obtain I and Q synchronous detection reference signals. It will be appreciated that when the Q channel signal output at 17 equals 0V then there is no phase error. However, if the output at 17 is not 0V, then there is phase error and the phase lock loop operation of phase shifter 12 functions to drive the phase difference to zero.

The variable phase shift circuit 12 is implemented as a series of capacitively loaded, logic inverters with variable supply voltage. The capacitive loading increases the propagation delay from inverter input to inverter output. Increased supply voltage decreases inverter propagation delay, thereby reducing inverter phase shift. A conventional phase locked loop comprised by the Q channel mixer 17 and associated loop filter 16 drives Q channel output of the synchronous detector 30 to zero thereby insuring proper phase synchronization for the I channel amplitude detection.

The I channel mixer 38 of the synchronous detector 36 mixes the output of amplifier 32 with the I channel output of frequency tripler 14, thereby providing the input signal for the level detection circuit 36. Forward path, level detection circuit 59 on the vehicle side is identical to the return path, level detection circuit 36 on the ground side with the exception that the former includes the carrier detection function and associated voltage comparator 138 (FIG. 7) which detects the presence of the return path signal.

Figure 7:
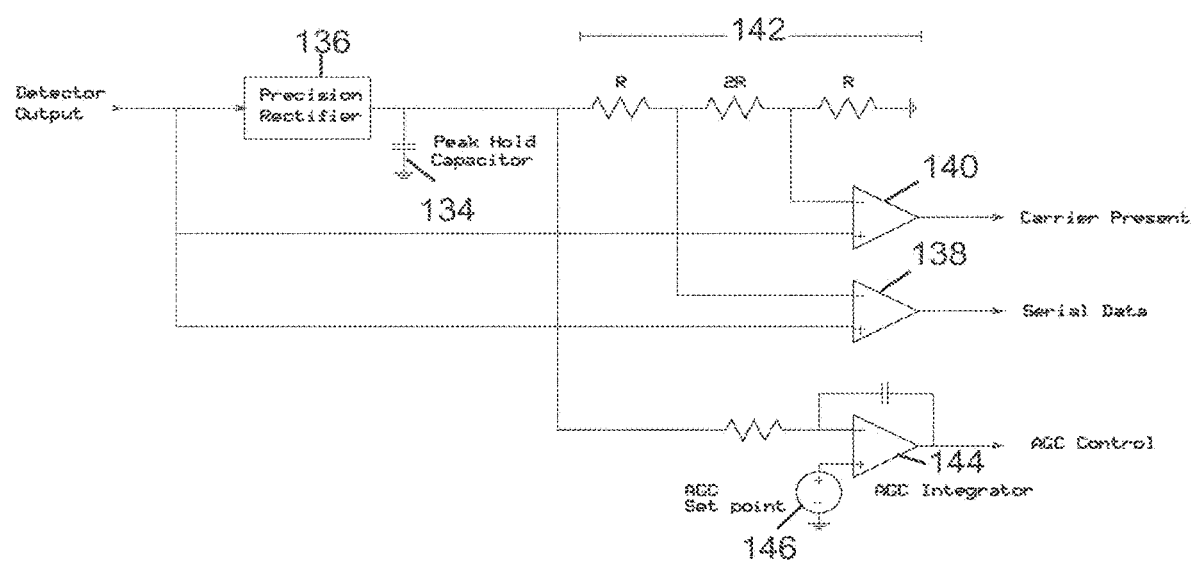
FIG. 7 shows an embodiment of receiver level detection circuits.

FIG. 7 shows an embodiment of the receiver level detection circuit 36. A peak hold capacitor 134 driven by a full wave precision rectifier 136 holds the maximum detected voltage level which, in turn, is held to a constant value by the AGC circuit 34 (FIG. 2). The AGC amplitude stabilized, peak detected voltage provides the reference voltage for the 1-0 serial, binary detection voltage comparator 138 and the reference voltage for the carrier detection voltage comparator 140 by means of a R-2R-R resistor voltage divider 142 that sets the voltage comparator reference voltages at 25% and 75% respectively of the peak value of the post detection waveform shown in FIG. 4. The carrier detection voltage comparator 140 provides fast indication of vehicle side fault occurrence. If a fault occurs on the vehicle side, such as sudden unexpected load shedding, the return link carrier is disabled immediately. The ground side apparatus detects the carrier removal delayed only by pre- and post-detection filter delay and immediately halts wireless power transfer. The full value of the peak hold function is applied to the AGC integrator 144 that adjusts the gain of the AGC amplifier 34 and thus the gain of amplifier 32 to maintain the peak hold capacitor 134 voltage equal to the AGC set point 146 voltage. The conventional precision rectifier 136 generates an output voltage proportional to the absolute value of the input voltage and consists of one or more small signal diodes placed within an op-amp feedback path, a configuration that effectively cancels the diode forward voltage drop thereby enabling precision rectification of low level signals with minimal error.

Alternatively, return link synchronous detection may be made by making use of a coherent, but not phase synchronized, I and Q detection channels. Amplitude and phase modulation may be extracted in the conventional fashion where amplitude is the root mean square of the I and Q channels and the phase angle is the arctangent of the ratio of I and Q. In this alternative embodiment, the phase shifting and phase locking circuitry is not needed.

FIGS. 1 and 2 show four loop antennas: a sending and a receiving antenna pair 70, 80 for the forward link and a second pair of antennas 70', 80' for the return link. In an alternative embodiment, the forward and return link antenna pair may be consolidated into a single loop antenna with a conventional antenna duplexer to separate and isolate the forward and return link signals. Likewise, it is also possible to multiplex one or both data link signals onto the wireless power transfer coils or onto auxiliary electromagnetic structures such as the eddy current generation coils that are part of the coil alignment error detecting apparatus described in U.S. Pat. No. 10,193,400.

For reasons of simplicity and cost reduction, it is desirable that the forward and reverse paths share a common antenna structure. The problem then is the combination and subsequent separation of the forward path and the reverse path signal from each other and from other electrical signals encountered by combining functionality into a single antenna structure. In general, there are two general methods to implement signal combination, separation and routing. The first method uses hybrid transformers, hybrid couplers, or directional couplers which distinguish between forward and reverse path signals by means of signal flow direction. The second method relies upon frequency selective filters that distinguish between signals on the basis of frequency. A frequency selective multiplexer may be implemented with LC lumped components, with distributed components or as a monolithic circuit containing a plurality of resonant elements and coupling elements. A frequency multiplexing functional block may combine both signal direction and signal frequency discrimination.

Figure 8:
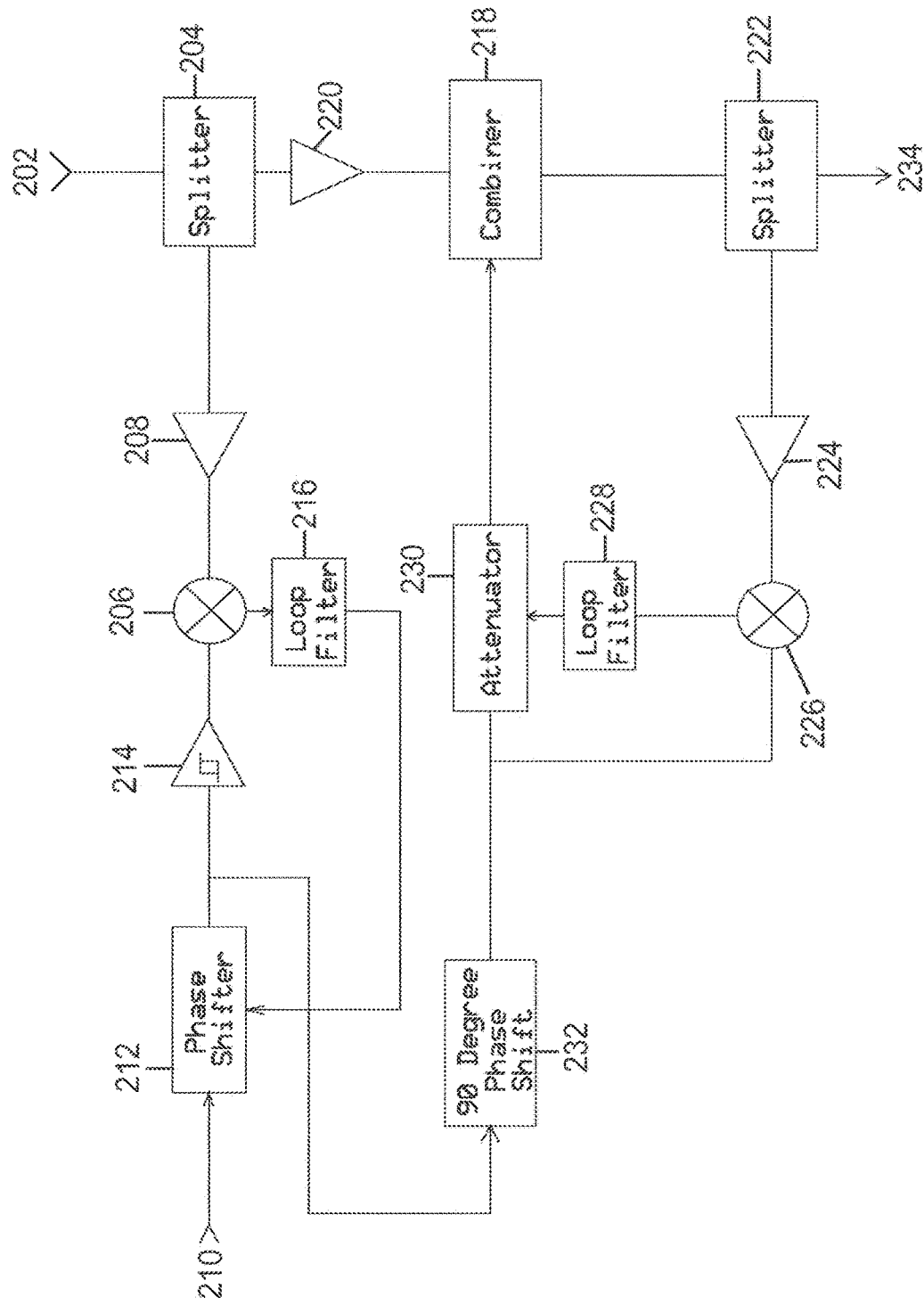
FIG. 8 shows an embodiment of an apparatus for self-interference cancellation.

The performance of a signal multiplexer functional block (circuit) may be enhanced by the addition of electronic signal cancellation as shown in FIG. 8. The electronic signal cancellation functional block (circuit) is placed in the path between the common forward/reverse path antenna and the receiver. The common antenna is connected to port 202 of signal splitter 204. One splitter output goes to the input port of mixer 206 by means of isolation amplifier 208. A sample of the signal to be cancelled is applied to port 210, and the applied signal is shifted in phase by variable phase shifter 212 and applied to the local oscillator port of mixer 206 by means of limiting amplifier 214. The mixer 206 output is applied to a loop filter 216 and then applied to the control port of the variable phase shifter 212. Components 212, 214, 206, and 216 constitute a phase control loop that insures the cancellation signal is 90 degrees out of phase with the unwanted signal component applied to port 202. Zero phase error corresponds to zero direct current voltage at the output of mixer 206.

As illustrated in FIG. 8, a second output of splitter 204 goes to combiner 218 by means of isolation amplifier 220. As illustrated, signal combiner 218, splitter 222, isolation amplifier 224, mixer 226, loop filter 228, and attenuator 230 together constitute an amplitude control loop. A portion of the quadrature sample signal output by phase shifter 212 is applied to the fixed 90 degree phase shifter 232 creating a 180 degree out-of-phase version of the cancellation signal, which passes through controlled attenuator 230 and into signal combiner 218, where if the cancellation signal amplitude is correct, complete cancellation of the unwanted signal is accomplished. One portion of the combiner 218 output signal is directed to the receiver input at 234 via splitter 222. Another portion is directed through isolation amplifier 224 to the signal port of mixer 226 which serves as a coherent amplitude detector driven by an unattenuated portion of the 180 degree out-of-phase cancellation signal. The output of mixer 226 is passed through loop filter 228 that controls the variable attenuator 230. Those skilled in the art will appreciate that zero cancellation signal amplitude error corresponds to zero direct current voltage at the output of mixer 226.

In operation, as a vehicle approaches a wireless charging station, communications is established before charging commences. Once charging commences, the full-duplex communications is used to mediate and to control multiple aspects of the wireless power transfer operation including transferred power level, output voltage and current, as well as monitoring of proper system operation. To establish control communications, the ground equipment may continuously or periodically emit a forward path signal while listening for a vehicle generated return path signal. Duplex communication is initiated upon detection of a vehicle generated return path signal. Alternatively, the vehicle side electronics may make initial contact with a return path signal temporarily derived from a temporary crystal oscillator (not shown) instead of the normally used carrier recovered by the homodyne detector 50, and non-coherently detected by the ground side electronics. Upon ground side reception of the vehicle signal, the ground side equipment emits a forward path signal. In the case of vehicle side communication initiation, the vehicle side apparatus disables the temporary crystal oscillator and reverts to coherent transponder operation upon successful homodyne detection and carrier recovery.

Both initiation methods described above rely upon the emission of a forward or a return path signal. Communications also may be advantageously initiated with no forward or reverse path emissions. In an exemplary embodiment, the ground equipment detects the change caused by an overhead vehicle in the impedance of the wireless power transfer coil and responds by emitting a forward path signal. This embodiment reduces or eliminates unnecessary signal emissions and is advantageous in some regulatory environments. In addition to the wireless power transfer coils, the initiating impedance change also may be detected in the coil alignment auxiliary coils or in the near field communications antenna. In addition to impedance change, changes in mutual impedance between isolated electromagnetic elements also may be used to initiate communications.

In the exemplary embodiment described herein, the reverse signal at 40.680 MHz is a simple integer multiple of the forward signal frequency at 13.560 MHz with both signals falling within existing, internationally designated ISM—Industrial, Scientific Medical—frequency assignments. Other frequencies and frequency pairs with non-integer frequency ratios may be used as well. For example, the two international ISM frequency bands with center frequencies of 2450 MHz and 5800 MHz may also be used. The coherent transponder architecture described herein combined with conventional phase locked loop techniques may generate a 5800 MHz signal that is frequency synchronized with a 2450 MHz signal with a frequency ratio M/N of 116/49, where M=5800 MHz and N=2450 MHz. Other combinations of ISM bands and non-ISM band frequencies, frequency pairs with other integer or rational fraction frequency and multiple simultaneous transmission and reception carrier frequencies are also possible. For example, multiple return path data channels, each return path data channel transmitting data at a different M/N multiple of the transmission frequency of the first inductive link, where M and N are integers, may also be used. Full duplex, frequency coherent communications is also possible with the ground and the remote apparatus linked by far field as opposed to near field propagation.

Dynamic Charging

Figure 9:
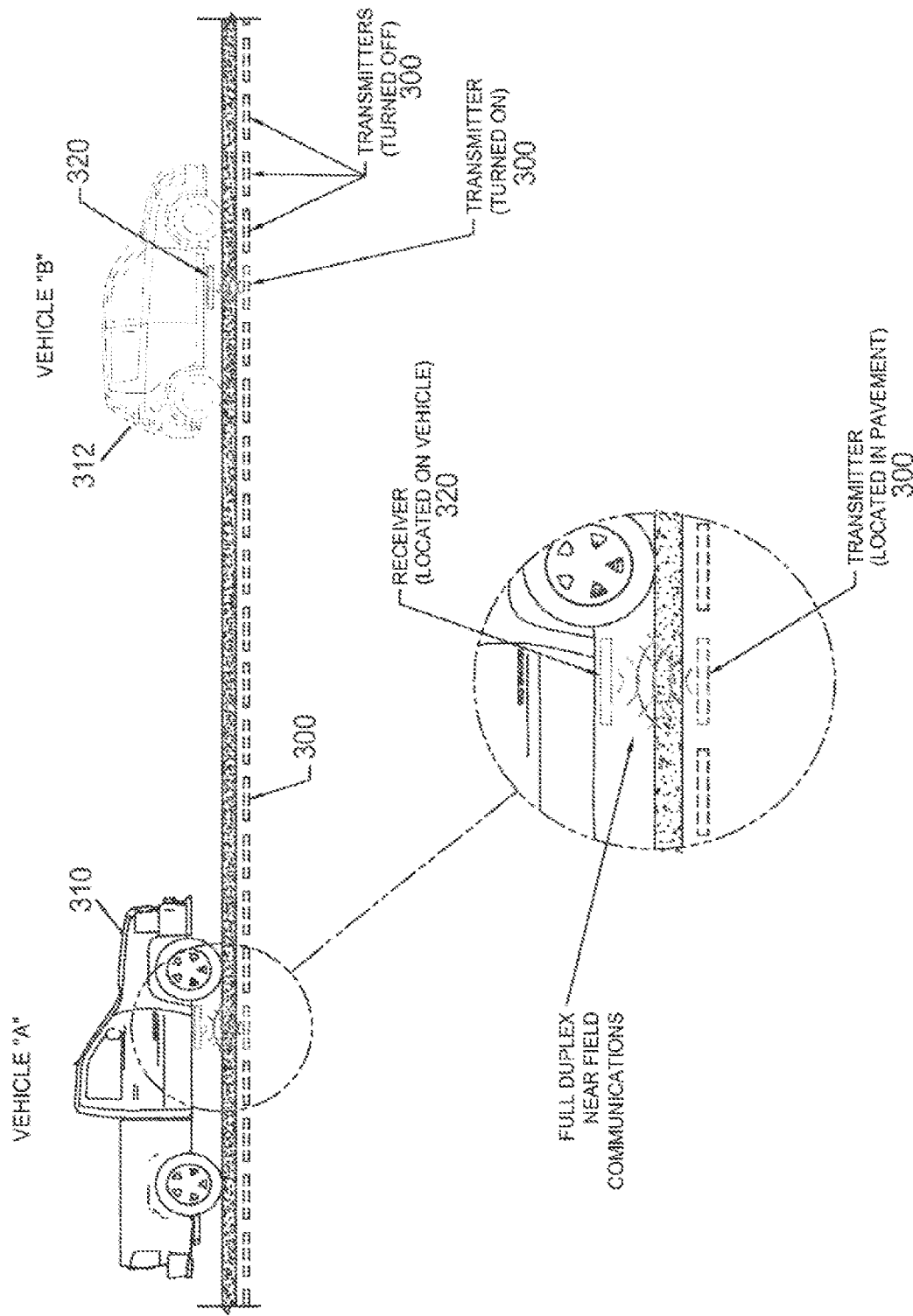
FIG. 9 illustrates an embodiment of dynamic charging using the communications methodology described herein.

Dynamic electric vehicle charging is a specialized case of providing electrical energy to an electrically powered vehicle while the vehicle is in motion. As illustrated in FIG. 9, the use of dynamic charging may be accomplished using resonant magnetic induction in which a plurality of independent transmitters 300 are installed in a roadway in a linear array and energized in a controlled sequence as a target vehicle 310, 312 travels above the linear array 300. Dynamic charging may be implemented when there is just one vehicle 310 moving over the array of transmitters 300, or in the more realistic circumstance, when there are multiple electric vehicles 310, 312 of differing types, velocities, and power requirements moving over the array of transmitters 300. In the latter case, the sequencing of the energization of specific transmitters 300 will be variable within the array and will depend on the various vehicle types and their motion, factors which are inherently unpredictable. Thus, the technology requirements of dynamic charging pose special technical challenges. The system described above solves the multiple problems of dynamic charging as enumerated below.

The most acute problem for dynamic charging is the need for vehicle-to-ground and ground-to-vehicle communications, where discrete, high speed, highly discriminatory and reliable data is transferred as a requirement for commanding and controlling the charging system. This data is required to operate the charging system in the case of one or several vehicles that may traverse a serial array of ground-embedded inductive power transmitters.

As shown in FIG. 9, an array of inductive power transmitters 300 is installed below a roadway, each transmitter 300 placed in a serial array along the longitudinal axis of the roadway. The intent is to provide a length of roadway that, when driven over by an electrically powered vehicle 310, 312, may supply electrical energy to the vehicle 310, 312 traveling over the linear array of inductive transmitters 300. It is desirable that only the transmitters 300 that are directly underneath the vehicle receiver be energized. The transmitters 300 that do not have a vehicle above them should remain inert (i.e., not energized).

In every instance of inductive power transmission, whether in the dynamic charging mode described here, or in the simpler case of stationary charging described above where a vehicle that is equipped with a single power receiver is parked and remains immobile above a single power transmitter that is embedded in the pavement, communication between the vehicle-based receiver and the ground-based transmitter occur. This is desirable for vehicle identification, billing for energy purchases, regulating current and voltage, resonant frequency, vertical gap separation distance, primary-to-secondary alignment, and for other purposes, such as safe operations and emergency power cut-off. This is also true in the case of a moving vehicle that is charging while it is in motion, except that the single transmitter built into the vehicle communicates with a plurality of independent transmitters in sequence. This moving one-to-one relationship imposes very significant communications challenges.

The method of operation for charging a moving vehicle is to have each independent transmitter 300 in the linear array energize to create a resonant magnetic field in a sequential pattern as the vehicle receiver 320 passes over each independent transmitter 300. The type of vehicle, its specific charging requirements, its velocity, alignment with respect to the transmitter 300, and its predicted trajectory are all important factors that make this problem difficult to solve.

As depicted in FIG. 9, it is certain to be the case that an array of pavement-embedded transmitters 300 will experience the presence of two or more vehicles 310, 312 simultaneously and respond to the variable conditions of each vehicle 310, 312. In this case, communications between each vehicle 310, 312 and the specific ground transmitter 300 over which it is positioned is discrete and discriminatory so that no other vehicle 310, 312 is confused or data transmissions from a nearby vehicle 310, 312 are received and misread. The requirements for this include that the data communications system be proximally constrained to the target area of the intended vehicle 310, 312. By comparison, broadcast radio and other systems such as Wi-Fi have a range that may easily be received by many nearby vehicles.

The first requirement is to have a highly proximal send-receive capability that is limited to less than 2 meters. (A vehicle moving at 60 MPH travels 88 feet per second. The time of exposure of the receiver to the transmitter may be on the order of 0.02 seconds. In this timeframe, a time delay in the signal transmission typical of digital communications systems of 0.04 to 0.07 seconds is clearly untenable).

The second requirement is to have no or very low time delay (or latency) in the signal. This is required because the vehicles 310, 312 may be moving at high rates of speed over the plurality of transmitters 300, and discrete communications between the onboard receiver 320 and any one transmitter 300 should be assured.

The third requirement is for the communications system to be able to "hand-off" or sequence the communications to the sequenced array of transmitters 300. This may be done by wiring the transmitters 300 to each other, or by allowing one transmitter 300 to communicate using the near field communication system described herein to address the adjacent transmitter 300 in the sequenced array.

The fourth requirement is for full duplex operation, or bidirectionality, so as to assure that in the very short time span that the vehicle 310, 312 is present over the transmitter

300, data may be exchanged in both directions—from the vehicle to the ground, and from the ground to the vehicle.

The fifth requirement is to allow uninterrupted communications under all weather and environmental conditions. This is accomplished by using magnetic energy, as described herein, which allows communication through bodies of water, snow, ice, and other inclement road surface conditions.

The sixth requirement is to avoid the problem of multiple antennas that are distal to the vehicle 310, 312. Multiple distal antennas introduce significant problems due to road pavement and vehicle body interference, such as multipath signal nullification. High reliability vehicle identification with multiple antennas is difficult to secure to avoid malicious hacking or other cyber-vandalism.

Those skilled in the art will appreciate that the communication system described herein offers a uniform solution to each of these requirements.

As noted above, dynamic charging allows moving vehicles to be charged while driving as the vehicles 310, 312 pass over transmitters 300 in the roadway. Each transmitter 300 is energized in a controlled sequence as it anticipates the presence of a vehicle 310, 312 above it. Since the vehicle receiver 320 is only "present" above any one charging station for a short time, a sequencing system is needed that knows where the vehicle's receiver and the charging station's transmitter are in relation to each other in real-time. Ideally, a pre-sequence firing procedure effectively establishes a traveling wave of magnetic energy that moves at the same rate as the vehicle receiver 320. In order to do this, a communication system with minimal latency, such as that described herein, is needed. As noted above, the communication system described herein is very fast (near-zero latency) and very proximal, so that where the receiver 320 is relative to a transmitter 300 is known. Thus, to enable dynamic charging, a series of charging stations equipped with the communications system described herein is provided. During operation, each charging station and/or vehicle transmitter provides information including, for example, vehicle identification, billing for energy purchases, regulating current and voltage, resonant frequency, vertical gap separation distance, primary-to-secondary alignment, and for other purposes, such as safe operations and emergency power cut-off, location, timing, trajectory, and/or speed information regarding the vehicle 310, 312 to the next transmitter so that the next transmitter fires when the vehicle's wireless charging receiver 320 is positioned over the transmitter 300 during travel.

Robust Hybrid Alternative Embodiment

For Wireless Power Transfer (WPT) systems of the type described herein, there is also a need for a secure, unambiguous point-to-point, low-latency, full-duplex link between ground side charging system and vehicle side charging electronics. The communications link needs to support Battery Management System (BMS) commands and other communications scenarios between ground and vehicular electronics.

Supported operational scenarios include static and dynamic charging under various weather conditions in domestic and international markets. An inductively coupled communications system (ICCS) is reliable in congested radio environments with both licensed and unlicensed co-channel users while at the same time causing minimal interference. This same inductive communications system is also designed to function though standing water, snow, and ice.

In one embodiment, the narrowband full duplex, low latency, near-field data link for control of a resonant induction, wireless power transfer system is augmented or replaced by a wideband full duplex, low latency, near field data link between the ground side assembly (GA) and vehicle side assembly (VA). This improved (hybrid or wideband) wireless duplex data link allows for greater security, higher data rates, dynamic bandwidth selection, frequency agility, and modulation scheme agility to meet local spectrum regulations, electric-and-magnetic fields (EMFs) safety, and data rate requirements for use in a near-field inductive coupling communications system.

To support the widest possible static deployment configurations, the datalink should be tolerant of interference generated by neighboring or proximate ground-side assembly emplacements. Proximate installations are attenuated either in distance (either geographically or in the case of parking garages, vertically) or by a shielding structure (for instance by curbs or floors as in parking garages). Neighboring systems may be sited in the next vehicle parking spot or lane. In some neighboring cases, multiple clustered ground assemblies may be deployed in the same parking spot or lane serve vehicles equipped with correspondingly clustered vehicle assemblies in a matching geometry. Adjacent deployments, where a "macro" GA is constructed of multiple, smaller clustered GAs are possible.

In dynamic charging deployment configurations, for instance in a GA-equipped travel lane, the datalink should be tolerant of interference generated by neighboring or proximate ground-side assembly emplacement as well as supporting a soft-handoff capability between successive ground-side assemblies or ground-side assembly clusters. In a soft-handoff, the vehicle's charging platform would support multiple datalinks to successive ground assemblies in sequence as it moves in the GA-equipped travel lane.

Clustered Charger Scenario

A modular coil design, where a single coil assembly may be deployed as a standalone Ground Assembly (GA) and where two or more coil assemblies may be clustered to achieve a larger (geometrically) Ground Assembly capable of higher power transfer, is advantageous in tailoring a WPT system to user needs. For example, in the case of a bus, truck, train, construction equipment, or any other vehicle that requires wireless power transfer necessitating a clustered ground side assembly and corresponding vehicle side assembly (VA) that are mounted located immediately adjacent to one another (e.g., a bus with a VA consisting of 4 adjacently mounted 50 kW charging coils with each coil assembly having its own duplex inductive communications), there is a need to mitigate interference of one coil's communication signals with the adjacent coil's communication signals.

With this deployment flexibility, the vehicle may have one, two or more vehicle assemblies mounted to allow higher power transfer than may be achieved with a single VA. Similarly, the ground assemblies (GAs) may be clustered together and selectively enabled to match the geometry of the VA installation. In such clustered deployments, where single GAs are installed in a tight, contiguous fashion to form a single, macro GA; the intrinsic advantage of the near-field datalinks in not interfering with other datalinks in proximity due to the inherent radiated power falloff range limitation is impacted. The magnetic field strength and magnetic field power drop at rates of $1/(r^3)$ and $1/(r^6)$ respectively (where r=radius) for the inductive communications link in the near field.

Although the far-field radiated magnetic field from the antenna falls off only as $1/r$ for magnetic field strength and $1/r^2$ for magnetic field energy, the magnetic near-field is dominant for distances up to about $\lambda/2\pi$. For example, the radiation resistance of the magnetic induction Near Field transmission antenna at 13.56 MHz is very small compared to its reactive impedance (typical ratio is smaller than 0.0005), as the vast majority of energy is coupled in the near field. Therefore, the propagated energy in the far-field of the magnetic signal is negligible compared to that of an equivalent intentionally radiating system. This strong drop-off of the field with distance means that although care is taken in dealing with signals from adjacent coils of the same clustered coil assembly, there is no concern of interference between coils of adjacent vehicles or charging stations.

Figure 10:
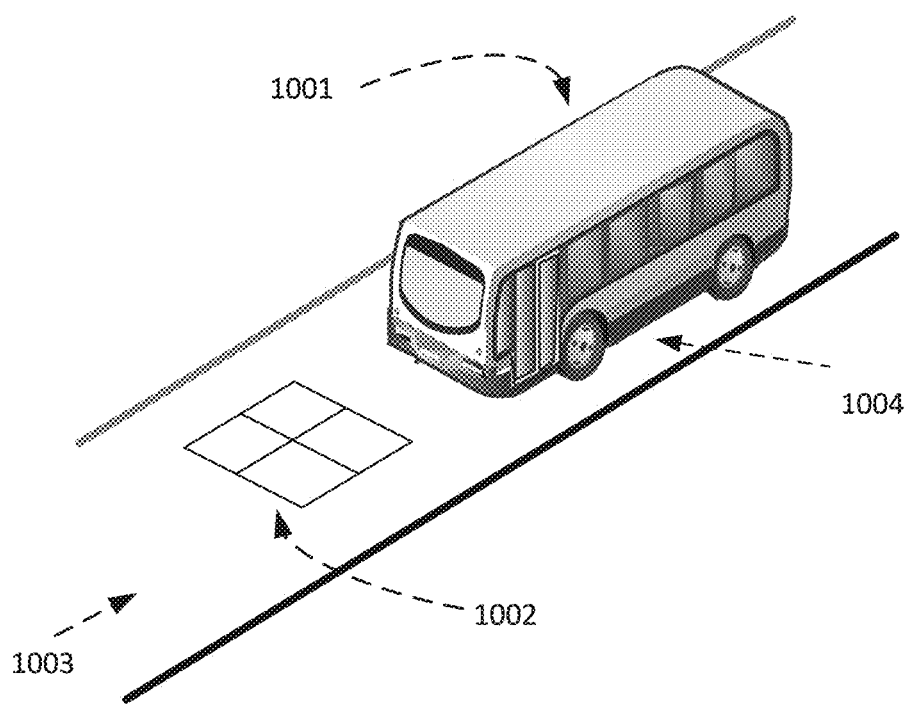
FIG. 10 illustrates an example of a clustered deployment of transmission equipment in a sample embodiment.

FIG. 10 illustrates an example of a clustered deployment in a sample embodiment. In this case, the vehicle (e.g. a bus) 1001 has been outfitted with a clustered vehicle assembly 1004 mounted to the underside of the vehicle 1001. As illustrated, a passenger stop or parking spot 1003 also has been equipped with the corresponding cluster deployed ground assembly 1002.

Figure 11A:
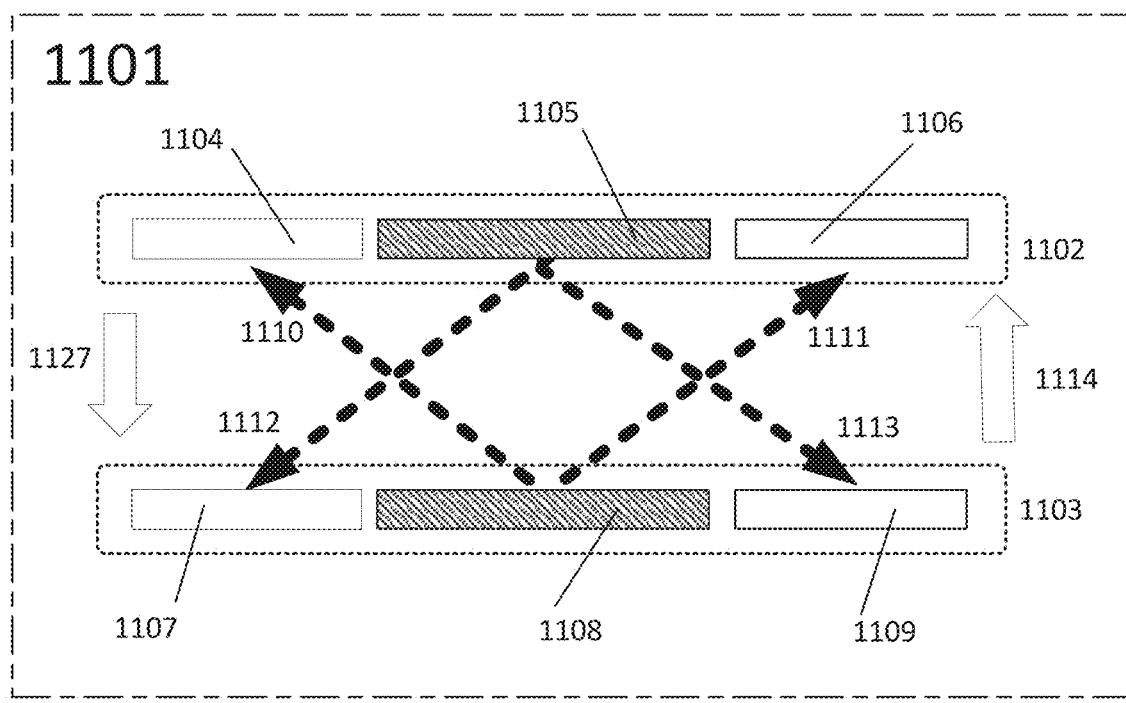
FIG. 11a illustrates the signaling and components used by the Wireless Power Transfer (WPT) system's inductively coupled communications system (ICCS) in sample embodiments.

FIG. 11a illustrates the signaling and components used by the Wireless Power Transfer (WPT) system's inductively coupled communications system (ICCS) 1101 in sample embodiments. FIG. 11a illustrates the ICCS 1101 cross-sectionally whereby the Vehicle Assembly (VA) 1102 and Ground Assembly (GA) 1103 are shown as vertically opposed. Other deployment options, for instance, a horizontal mounting with the VA 1102 on the side of a railcar and a GA 1103 mounted on a wall is possible. Any GA-to-VA orientation in a deployment may be made as long as close parallel opposition between the VA and GA is achievable. The VA 1102 communications components include at least a pair of receive antennas 1104 and 1106 located on the periphery of a single transmit antenna 1105. The VA receive antennas 1104 and 1106 receive the transmission 1110 and 1111 from the GA transmission antenna 1108. Similarly, the GA receive antennas 1107 and 1109 receive the transmitted signal 1112 and 1113. The bidirectional charging signal 1114 or 1127 may be present at any time during a communications session.

Additional near-field receiver antennas may be deployed to assist in signal reception and improve the collateral capabilities provided by the full duplex communications system.

Figure 11B:
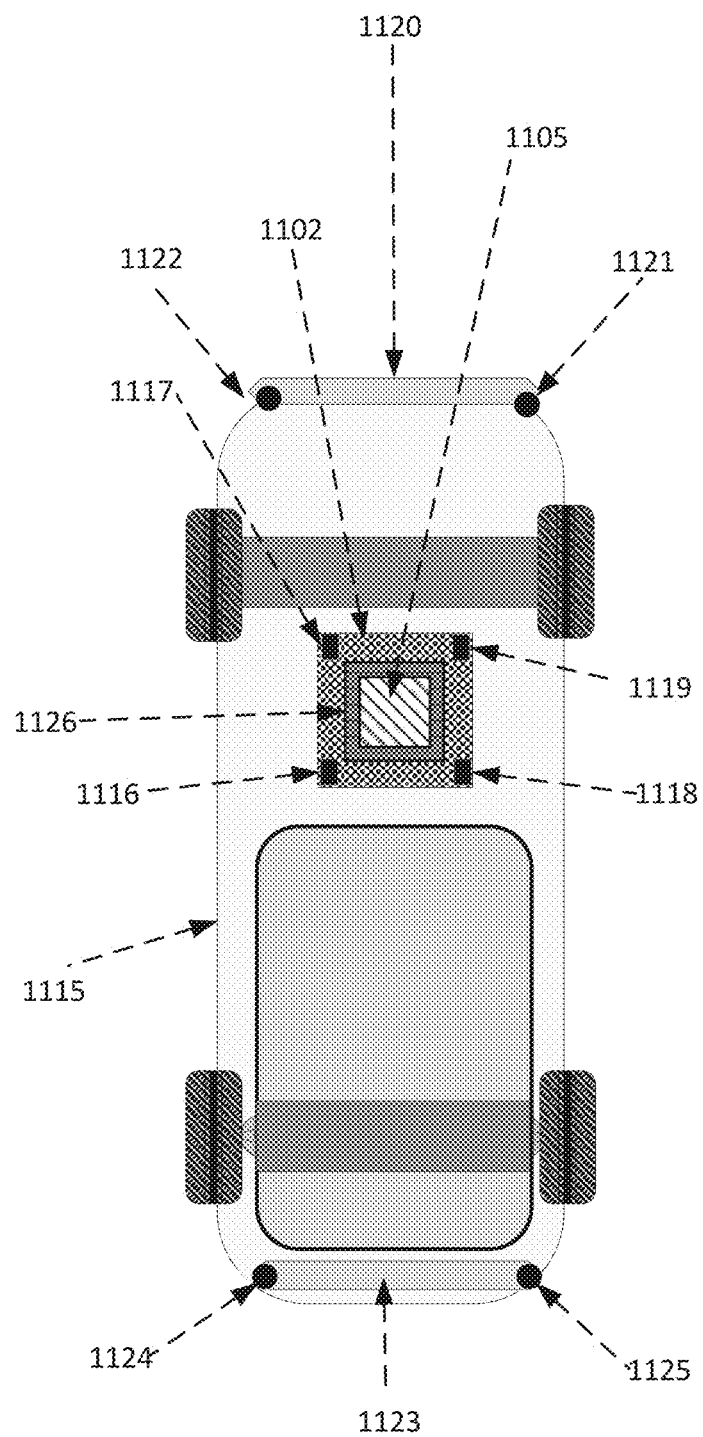
FIG. 11b shows an example of diversity receiver antennas for the Wireless Power Transfer (WPT) system's inductively coupled communications system (ICCS).

FIG. 11b shows an exemplary electric vehicle 1115 from beneath. In one embodiment, additional receiver antennas may be emplaced on or within the VA 1102. With at least two antennas on the x-axis (front-to-back) and at least two antennas on the y-axis (left-to-right) the VA 1102 would be enabled to determine GA coil alignment displacements along both of the x and y axes. Preferentially, these VA-mounted receiver antennas 1116, 1117, 1118, and 1119 would be placed on the four corners of the VA 1102, within the range of the magnetically coupled GA transmitter's 1108 signal 1112 and 1113. The VA coil assembly 1126 for transmission and reception of the bidirectional charging signal 1114 and 1127 also resides in the VA 1102 nominally under the transmission antenna 1105 of the VA 1102. The GA (not shown) architecture replicates the communications antennas and charging coil assembly to mirror those of the VA 1102 to enable duplex communications and bi-directional charging.

Note that additional diversity receiver antennas may also be located anywhere on the vehicle, preferentially displaced as far as possible along the length and width of the vehicle forming a secondary distributed antenna/receiver system 1121, 1122, 1124, and 1125. Due to the range from the GA-based transmitter from the distributed antennas 1121, 1122, 1124, and 1125, the receiver antenna could be either magnetic inductive loops or near-field antennas as dictated by the reactive near-field range and radiative near field (aka the Fresnel region) range of the GA transmitter's 1108 signal 1112 and 1113. In some embodiments, the displaced diversity receive antennas may be magnetically coupled by either co-planar, parallel, or orthogonal (to the transmitter loop antenna) mounted loop antenna dependent on range from the magnetic transmission antenna(s). A hybrid loop antenna, with one loop element parallel to the transmitter loop and a second loop element set orthogonal may also be used to extend the magnetically coupled link in cases where transmitter-to-antenna range or the ability for a co-planar mounting is uncertain.

In the dynamic charging case, a distributed forward antenna or antennas 1121 and 1122 allow for increased communication range enabling communication with GAs forward of the current GA. This advanced communication enables GA in the path of the vehicle power-up time prior to need to minimize ramp-up. The distributed lateral antennas right 1122 and 1124 and left 1121 and 1125 also provide for centering alignment in the direction of travel to maximize coil efficiency.

In one physical embodiment, four or more receiver antennas 1116, 1117, 1118, and 1119 are distributed on the VA 1102 in anterior and posterior (in relation to the forward direction of travel) fashion and on the right and left transverse fashion. Four additional antennas 1121, 1122, 1124, and 1125 are added with 2 affixed to the front 1120 (e.g. in the bumper, under the bumper, or on the vehicle frame) and 2 on the rear 1123 similarly affixed or embedded. In both the front and rear deployments, the antennas should have maximum possible separation to the left and right on the transverse axis.

The distributed antennas can be backhauled to the ICCS 1101 using either wired or wireless (e.g. Bluetooth, Zigbee (IEEE 802.15)) connections. The ICCS 1101 will compensate for the differing reception and processing time needed for the communications link method and data protocol used.

The distributed antennas 1121, 1122, 1124, and 1125 with a common or known offset to the horizontal plane also enable increased alignment capability. With diversity receivers, positioning and ranging techniques such as Signal-Strength-Measurement (SSM), Time-of-Arrival (TOA), and Time-Difference-of-Arrival (TDOA) become available. Use of a directional receiver antenna would enable the Angle-of-Arrival (AoA) technique. The front-of-vehicle-mounted directional antennas with the AoA technique is especially advantageous for positioning and alignment in the forward direction.

An Intelligent Transport System's (ITS) permanent 79 GHz band allocation facilitates use of, TOA, TDOA, AOA, or hybrid positioning using two or more of the described techniques. The twelve ITU (International Telecommunication Union) defined Industrial, Scientific and Medical (ISM) bands are another potential spectrum for use in alignment (6 are globally available, the other 6 ISM bands may be available dependent on local regulations). Alignment precision will vary with the use of higher frequencies providing greater resolution and lower frequencies providing lower resolution.

Use of the distributed antennas with the TDOA, AOA, or TDOA-AOA hybrid positioning techniques can be used in the generation of a Z-Axis (vertical) measurement. In some embodiments, non-radio means, for example an ultrasonic transducer range-finder could be used for Z-axis estimation.

Alternately, if a vehicle is not properly equipped, the nominal Z-Gap for the make, model, manufacturer, and variant could be uploaded either from the vehicle or a landside networked server for use in setting the Wireless Power Transfer GA voltage and coil enablement in the coil cluster.

Software Defined Radio

One option for implementation of the improved ICCS 1101 is by use of software-defined transmitters and receivers to improve the signaling between the ground station and vehicle installation using the inductive coupling communication between the ground side assembly (GA) 1103 and vehicle side assembly (VA) 1102.

The ICCS 1101 is designed in sample embodiments to be selectable among two or more types of circuitry for amplitude modulation, phase modulation, and frequency modulation, as well as circuitry enabling use of spreading techniques such as direct sequence spread spectrum and Chirp spread spectrum (CSS) (e.g. binary orthogonal keying (BOK), frequency hopping, and direct modulation (DM)) as necessary. As described below, such features may be implemented in a field programmable gate array (FPGA) in sample embodiments, although the described functionality may also be deployed using discrete integrated circuit components and/or multichip modules and/or in software executed by other processing devices such as a digital signal processor (DSP). In some embodiments, the ICCS 1101 may use multiple simultaneous subcarriers as in an Orthogonal Frequency Division Multiplex system (OFDM) wherein the subcarriers may be assigned to unlicensed spectrum (or reserved spectrum) and use any of the modulation schemes described.

Figure 12A:
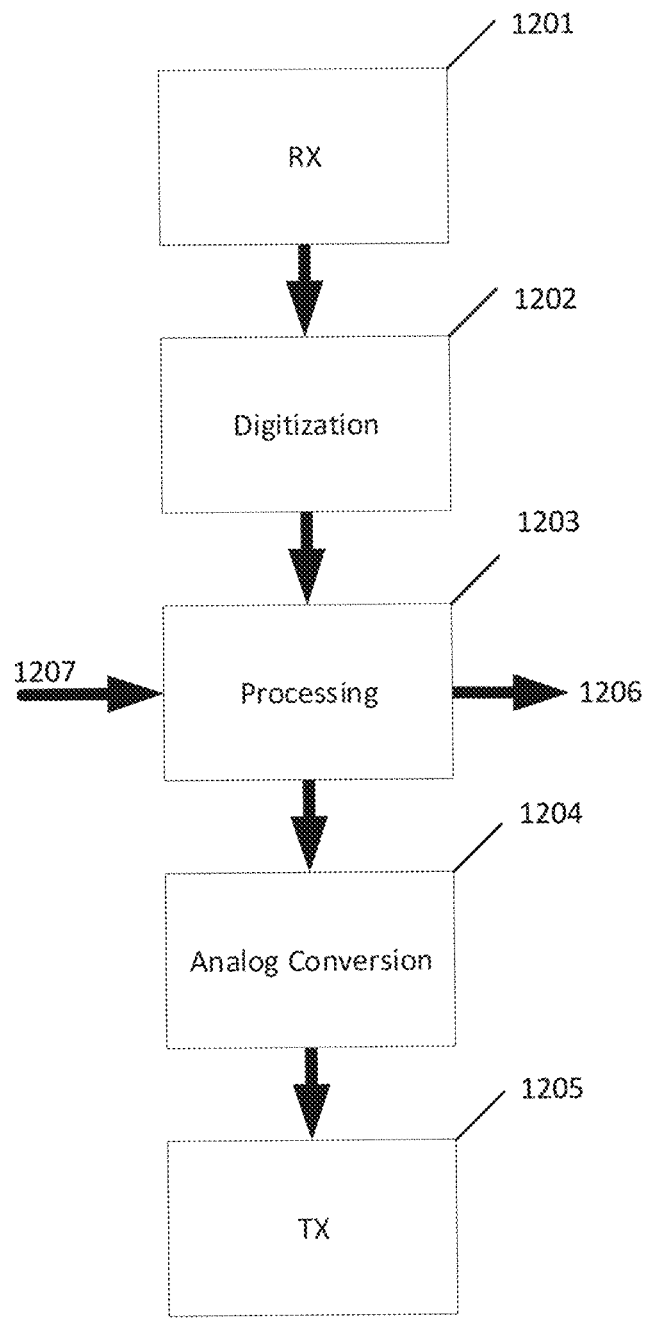
FIG. 12a illustrates the functional elements of the ICCS in sample embodiments.

FIG. 12a illustrates the functional elements of the ICCS in sample embodiments. As illustrated, a receiver 1201 uses an antenna or antennas specialized for magnetic inductive signaling. The received analog signal may be filtered in the receiver 1201 as described above. The received signals are processed by digitization elements 1202 to take the received analog signal and convert it into a digital representation of the signal. The digital representation of the received signal is then digitally processed by processing element 1203. Data extracted from the processed signal is then output via a digital interface 1206.

Incoming digital data also may be applied to the processing element 1203 via an input interface 1207. The incoming data is packaged by the processing element 1203 prior to conversion to an analog signal in the analog conversion element 1204. Once in analog form, the signal can then be filtered and transmitted by transmitter 1205 via an antenna or antennas specialized for magnetic inductive signaling.

In sample embodiments, the ICCS functional elements of FIG. 12a may be implemented in any of a number of ways. For example, the ICCS may be configured as:
 a circuit comprised of discrete integrated circuits (ICs) (e.g., an analog to digital converter (ADC), a digital to analog converter (DAC)) with programmable elements (e.g., a field programmable gate arrays (FPGAs), EEPROMs, etc.);
 as mixed hardware (ICs), software, and embedded firmware in a multi-chip module;
 as firmware residing in an application-specific-integrated-circuit (ASIC) that contains the needed control logic, digitization and analog conversion function; and
 as software structures running on a computing platform (e.g., a central processing unit (CPU) or digital signal processor (DSP)) with attendant digital to analog and analog to digital circuitry.

In each case, analog signal filtering may be included as necessary for the design selected (e.g., for super-heterodyne designs with bandpass intermediate frequency (IF) stages or direct conversion designs with limited analog bandwidths).

Election of which ICCS implementation (FPGA vs. DSP) and deployment (as an assembly of Discrete ICs, multi-chip IC module, or ASIC) to use is highly dependent on development costs, production volumes, and cost of computing resources with the necessary. In implementations, the FPGA offers parallel path signal processing while the CPU/DSP offers superior memory access and an operating system to simplify tasking. The discrete IC packaging gives the most flexibility in selecting components and placement of those components, while the multi-chip module offers fixed interconnections between discrete components. The ASIC package offers in both ICCS components and interconnections into a single integrated subsystem at the highest development time and cost, but the simplest to deploy. In sample embodiments, the ICCS configuration is selected at the time of manufacturing but may also be user selectable during use.

Figure 12B:
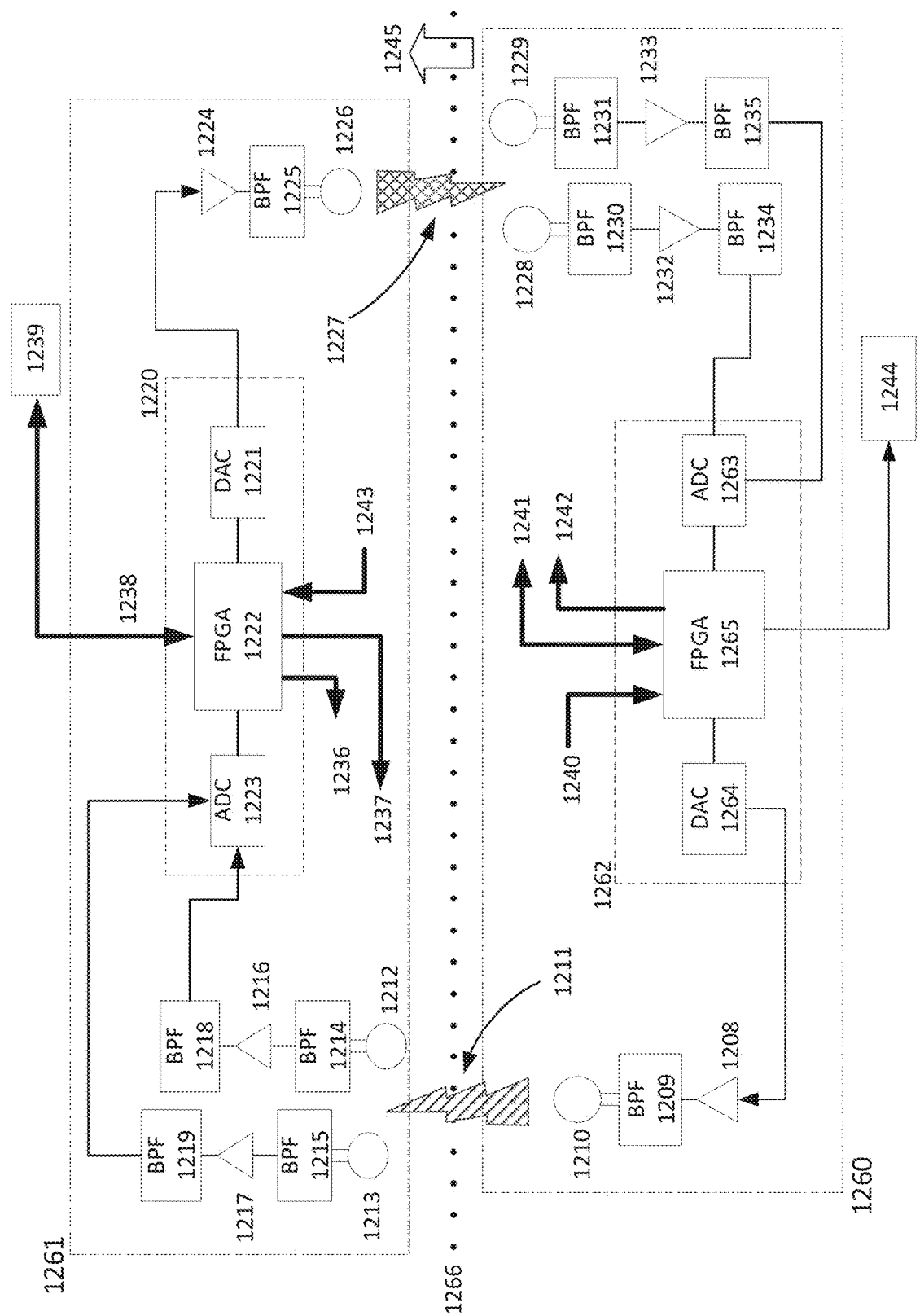
FIG. 12b illustrates a sample hardware embodiment of the ICCS including the vehicle side assembly and the ground side assembly.

FIG. 12b illustrates a sample embodiment of the ICCS 1101 including the VA 1202 and GA 1201 in a discrete integrated circuit embodiment. As illustrated, the communication channels 1211 and 1227 use magnetic induction coupling with minimally propagating magnetic fields for the short-range, low-power magnetic field link between the GA 1260 and VA 1261. The GA communication signal 1211 and the VA communication signal 1227 may either be narrowband or wideband depending on the preset programming, the stage of the charging cycle (approach, rough positioning, fine positioning, Foreign-Object-Detection (FOD) and Live-Object-Detection (LOD) scanning, charging, charging termination), or whether a threshold of signal quality (e.g. received signal strength, Bit-error-rate) has been crossed.

The core 1262 of the GA inductively coupled communications system 1260 includes a Field Programmable Gate Array (FPGA) 1265, an Analog-to-Digital-Converter (ADC) 1263, and a Digital-to-Analog-Converter (DAC) 1264. The FPGA 1265 supplies the computation resources. Computational operations by the FPGA 1265 include signal processing (e.g. signal summation, combination, and selection; modulation, demodulation, digital filtering, data extraction, automatic gain control (AGC), and ICCS hardware control). Data from the GA and external systems are input into the GA core 1262 via a digital interface 1240 for processing for transmission to the VA 1261.

The GA core Digital-to-Analog Converter (DAC) 1264 serves to transform the FPGA's digital output bit stream into a quantized analog signal before being amplified by the transmit amplifier 1208 and then being band-limited and smoothed by the bandpass filter 1209 and transmitted by the GA transmit antenna 1210, which propagates as the inductive magnetic signal 1211.

The GA communication's signal 1211 crosses the air gap 1266 between the VA 1261 and GA 1260 and is then received at the VA receiver antennas 1212 and 1213 (note that in this example, two receiver antennas are used, but the design supports use of a single receiver antenna and any plurality of receiver antennas). Once received by one or more of the VA's paired coupling antenna structures 1212 and 1213, the GA signal is then bandpass-filtered using filters 1214 and 1215. The band-limited signals are then amplified by the pair of low-noise-amplifiers (LNAs) 1216 and 1217, one for each VA receiver path. A second pair of bandpass filters 1218 and 1219 are then used to limit the signal frequency bandwidth for direct digital conversion on each of the VA receive paths.

The analog-to-digital conversion takes place at the VA ADC 1223. The VA ADC 1223 may be implemented either as a paired set of ADCs or as an n-channel ADC (depending on the number of receive antennas used). The digitized signal is then passed to the VA FPGA 1222. The VA FPGA 1222 converts the received digitized signals using conventional Digital Signal Processing techniques and then processes the reconstructed bit stream (e.g. removing the framing, training sequences, implementing the forward error correction and data encoding (e.g. coding from using convolutional coding, turbo coding, Hamming Codes), decoding security-masked bit sequences) and delivers the bit stream via a digital interface 1238 to the Vehicle Battery Management System (VBMS) 1239, potentially thru intermediary processors, networks, and protocols such as the Controller Area Network (CAN bus) (not shown). Measurements related to the communications signals are output on a digital interface 1236 to vehicle-based processor 1250. Measurements related to the charging signal are output on a digital interface 1237.

The Vehicle Battery Management System (VBMS) 1239, the Vehicle's Occupant information system, the Vehicle's entertainment system, and other vehicle-borne data or telemetry systems provide a bit stream to the VA FPGA 1222 via the digital interfaces 1238 and 1243 dependent on the configuration of the VBMS and vehicle on-board systems. The VA FPGA 1222 applies the framing, training sequences, implementing the forward error correction and data encoding (e.g. using convolutional coding, Hamming Codes, Hadamard code), encoding security-masked bit sequences) and delivers the bit stream to the VA Digital-to-Analog-Converter (DAC) 1221. The output of the VA DAC 1221 is then amplified by a transmit amplifier 1224. The VA signal for transmission is then filtered by a bandpass filter 1225 to match the desired channel bandwidth. The band-limited analog VA signal is then transmitted using a coupling antenna structure 1226 over the magnetic field air interface 1266.

The VA's inductive magnetic signal 1227 is received by one or more of the GA's coupling antenna structures 1228 and 1229. The VA signal is then bandpass filtered on each GA receive path using filters 1230 and 1231. The band-limited signals are then each amplified by the pair of low-noise-amplifiers (LNAs) 1232 and 1233, one for each GA receiver path. A second pair of bandpass receivers 1234 and 1235 are then used to limit the signal frequency band for direct digital conversion on each of the GA receive paths. In some configurations of the ICCS, the band pass filters 1209, 1214, 1215, 1218, 1219, 1225, 1230, 1231, 1234, and 1235 may be constructed as a switched filter bank to accommodate multiple frequency bands.

The analog-to-digital conversion takes place at the GA ADC 1263. The GA ADC 1263 may be implemented either as a paired set of ADCs or as a two-channel ADC. The digitized signal is then passed to the VA FPGA 1265. The VA FPGA 1265 converts the received digitized signals using conventional Digital Signal Processing techniques and then processes the reconstructed bit stream (e.g. removing the framing, training sequences, implementing the forward error correction and data encoding (e.g. using convolutional coding, turbo coding, Hamming Codes), decoding security-masked bit sequences) and delivers the bit stream to ground-side computation resources 1241 local to the wireless charger and external communications interfaces 1242, potentially thru intermediary processors, interfaces, and protocols (not shown). In case of a detected (by the GA) or transmitted (by the VA) failure event, the GA FPGA 1265 signals the Emergency Shut-off 1244 (e.g. in the event of a coil failure or thermal threshold exceeded) which disables the charging signal 1245.

Closed and Open Loop Control and Reporting

The ICCS 1101 actively measures both the charging signal 1245 and communication signals 1211 and 1227. Measurements may include received signal strength, bit-error-rate, sum and difference of the signal 1227 as received by the first 1228 and second 1229 antenna structures, Eb/No (ratio of Energy per Bit (Eb) to the Spectral Noise Density (No)), received signal strength indication (RSSI), center frequency, and amplitude and phase shift at the first and second receive antennas 1228 and 1229. The measurements may be delivered via the GA digital control interface 1241 to ground or the VA digital control interface 1236 for one or more vehicle-based processors 1250 for alignment detection, and closed loop charging system management and control.

The closed loop control may include providing to the FPGA 1222 near real-time voltage and current measurements (on VA), VA thermal measurements, Z-gap changes due to loading or unloading of the vehicle, soft VA or GA failure (clustered) alerts, alerting of mid-charging performance events, and conveyance of additional sensing on vehicle side related to the VA or vehicle electrical system to the GA and VA as needed.

The VBMS 1239 uses the VA control digital interface 1238 to pass commands for transmission to the charging system which may command the GA via the GA control digital interface 1241.

Spread Spectrum Wideband Signal

In one embodiment, the wideband signal used for the full duplex VA-GA communications link is an asynchronous direct sequence spread spectrum signal using complementary code sequences. In some deployment scenarios, e.g. in cases where GAs are deployed adjacently as components of a larger macro-GA cluster (for instance as a single vehicle parking spot charger), distance cannot be relied on to provide sufficient magnetic signal attenuation to mitigate co-channel interference between the multiple GA-to-VA and VA-to-GA transmissions. The use of spread sequence techniques allow for each of the GA and VA receivers to distinguish between signals sent for each receiver and co-channel interference. The use of complementary codes in a direct sequence spread spectrum system are used to allow correlation processing by the receivers to overcome the co-channel interference and lack of synchronization between transmitters of both the GA and the VA.

With sufficient distance between GAs (and paired VAs), signal attenuation of the magnetic signals permit code reuse which in turn allows for shorter code sequences. With shorter code sequences, the number of 'chips' per bit in the direct sequence spread spectrum system can be minimized resulting in greater data rates over the same bandwidth.

In a communications system using inductive coupling for transmissions, signal reflection and multipath are minimized by the innate physics of magnetic field propagation. In one embodiment, direct sequence code spreading using complementary code sequences is designed to mitigate co-channel interference between closely sited (clustered, adjacent or proximate) transmitters and receivers such as in a wireless charging parking lot or lane.

Use of an asynchronous system allows multiple, individual Ground Assemblies, each with its own transmitter and receiver, to be deployed in adjacent or proximate fashion without need a shared real-time timing source. The lack of need for a common timing source removes the need for clock recovery and/or phase locking between the GA and VA systems. Each aligned GA and VA pair thus may communicate independently regardless of the deployed number of units or the number of units functional. If a GA is unpaired with a VA (due to differing deployment geometries or VA failure conditions) that GA will not initiate a charging signal.

In sample embodiments, such a charging system may be used to charge a vehicle by positioning the VA of the vehicle with respect to the GA so as to receive a charging signal. The coils of the GA and the VA are selectively enabled based on geometric positioning of the VA relative to the GA for charging so that only the aligned coils are activated. As appropriate, one or both of the transmit/receive systems of the GA and VA are selected to have a same type of signal processing circuitry. The transmit/receive systems may then then be used to communicate charging management and control data between the transmit/receive systems of the GA and VA over inductive links during charging.

As noted above, the transmit/receive systems may include hardware, software, and/or firmware that provide one or more of amplitude modulation, phase modulation, frequency modulation, Orthogonal Frequency Division Multiplexing (OFDM), and spread spectrum that implements techniques including at least one of direct sequence spread spectrum, Chirp spread spectrum (CSS), binary orthogonal keying (BOK), frequency hopping, and direct modulation (DM). The types of transmit/receive systems are selected to be the same at design/manufacturing time or by user selection, for example. The VA and GA may then communicate software updates, diagnostic or telemetry information, and/or passenger entertainment services data therebetween during charging.

Figure 13A:
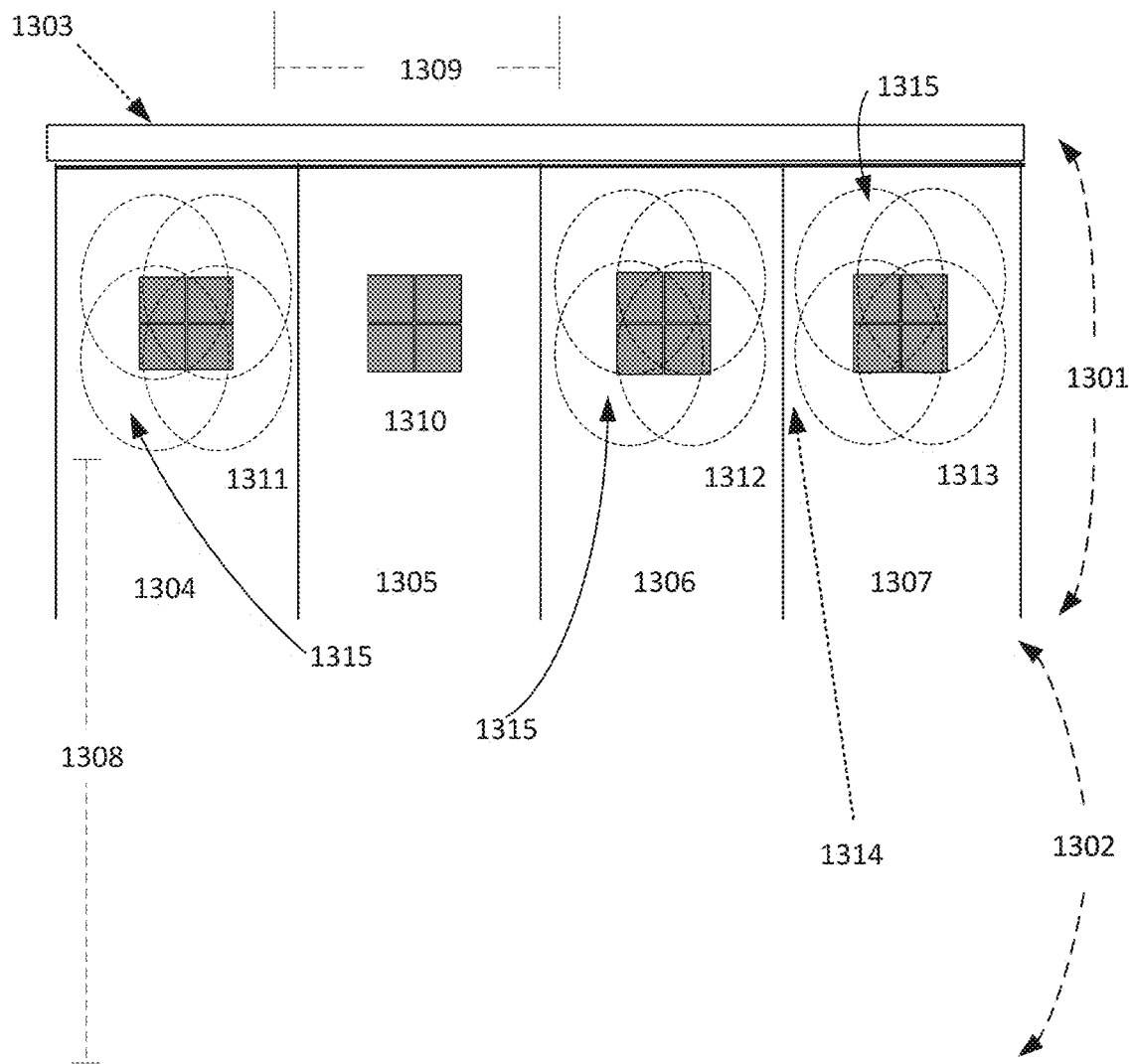
FIG. 13a illustrates an overhead view of a parking lot based wireless charging station deployed in a single-row geographic arrangement in a sample embodiment.

FIG. 13a illustrates an overhead view of a parking lot based wireless charging station deployed in a single-row geographic arrangement 1301 in a sample embodiment. The parking spots 1304, 1305, 1306, and 1307 are defined by the curb 1303 and painted line marker as is typical. A travel lane 1302 provides vehicle access to each parking spot. In this example, each parking spot 1304, 1305, 1306, and 1307 has a wireless charging ground assembly (GA) 1310, 1311, 1312, and 1313 installed. The GAs 1310, 1311, 1312, and 1313 are shown as clustered assemblies of four adjacent, independent GAs, although other geometries are possible to the length and width of the parking stall.

The active GAs 1311, 1312, and 1313 radiate a magnetic communications signal 1315 before and during each charging session. Due to the propagation characteristics of a coupled magnetic induction signal and vertical antenna orientation, co-channel interference is limited to within GA clusters and potentially between neighboring parking stalls 1314.

The magnetic signal radiated by each active GA cluster 1311, 1312, and 1313 is one source of co-channel interference for each (in this example there are up to 8 signals per cluster, 4 from GA to VA and 4 from VA to GA when active) communications link. Potential overlap or impingement of magnetic signals 1315 from a nearby active GA 1312 or 1313 equipped parking spots is also possible, but with sufficient physical separation 1309 between non-neighboring active GAs 1311 and 1312 serving to vastly reduce or eliminate potential co-channel interference. Possible additional chargers across the travel lane 1302 will have sufficient physical separation 1308 to limit co-channel interference potential.

Figure 13B:
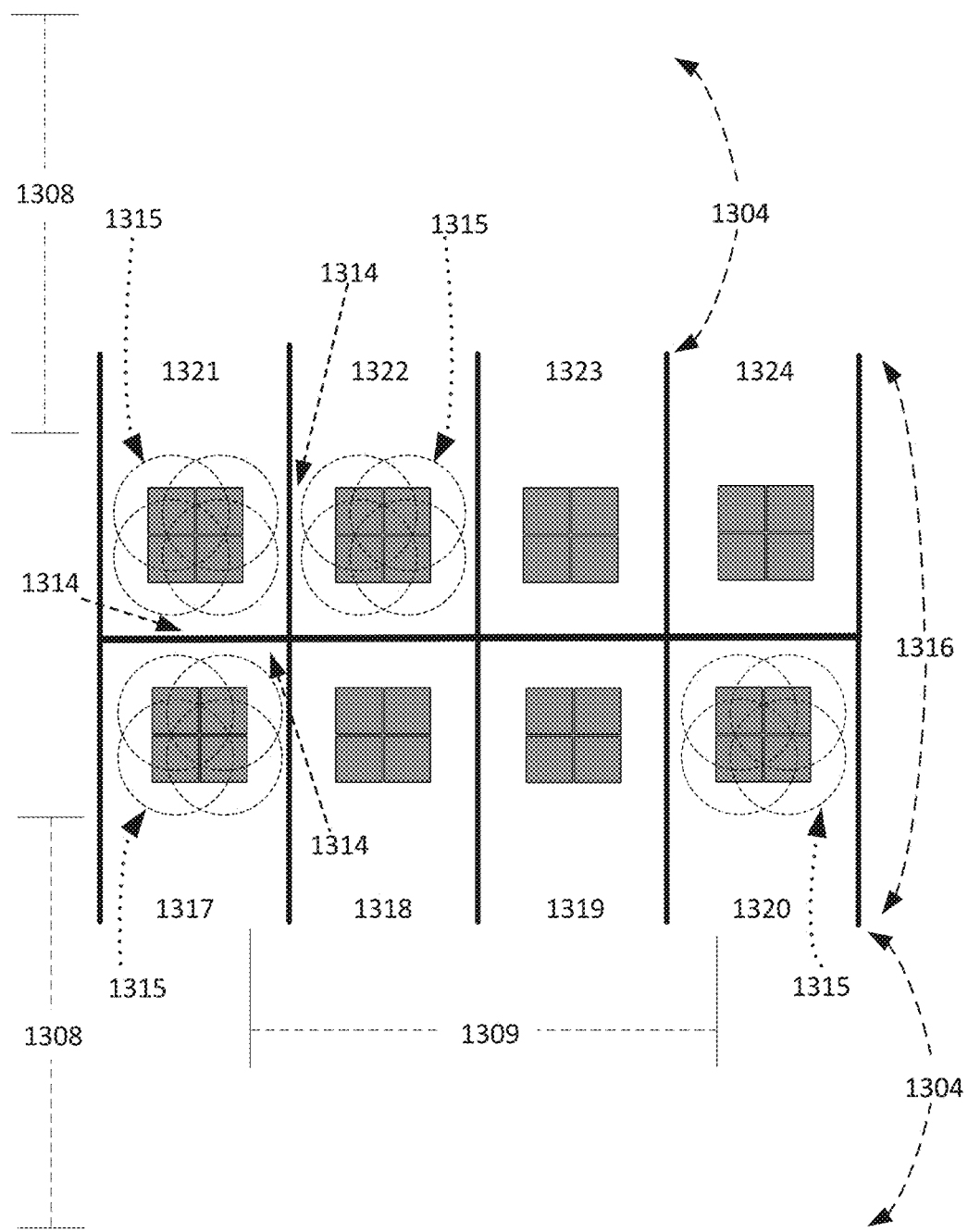
FIG. 13b illustrates an overhead view of a parking lot based wireless charging station deployed in a double-row geographic arrangement in a sample embodiment.

FIG. 13b illustrates an overhead view of a parking lot based wireless charging station deployed in a double-row geographic arrangement 1316 in a sample embodiment. The double row 1316 of GA equipped parking is isolated by travel lanes 1304. In this illustration, parking spots 1317, 1320, 1321, and 1322 have currently active GAs while parking spots 1318, 1319, 1323, and 1324 are non-active (i.e., in a non-charging state, parking spots may be unoccupied, or occupied but with charging that is non-operational, terminated, or not yet started). Potential co-channel interference of the magnetically coupled full duplex communications system is present in the active parking stalls (those that radiate a magnetic signal 1315). Co-channel interference between each of the cluster of GAs in a macro GA (here the macro GA consists of 4 adjacent GAs each with independent duplex communications) and potential co-channel interference 1314 between neighboring macro GAs is tolerated by the communications system. Same row nearest active GAs 1317 and 1320 or across row active nearest GAs 1322 and 1320 with sufficient geographic isolation 1309 are not potential interferers as are possible GAs geographically distanced 1308 across the one or more travel lanes 1304 that provide access to the double row charging station 1316.

Enabled Communication Links

In one embodiment, during the charging cycle, the full duplex link is always enabled, providing continuous communications between the VA and GA as well as a secure conveyance for vehicle software updates, diagnostics, telemetry, entertainment, and other information. The ICCS 1101 supports changes in transmission and reception frequencies, modulation and coding to support specific events prior to, during and after a charging session.

In clustered deployments, each individual GA may support an independent communications link with each individual VA. In this way, a clustered GA may support a lone VA or clustered VA (e.g. 1 row of 2 VAs; 2 rows of 2 VAs; 3 rows of 2 VAs; and so on up to the maximum width and length of the vehicle) or even a partially operative VA by only activating the charging signal for GAs with geometrically corresponding VAs. Use of independent communications eases both deployment and operations as a single charging site may support multiply configured vehicles. Alternatively, the GAs may be deployed as a coordinated cluster where once the charging signal is activated a single GA and VA maintain communications.

Static Case

The duplex communication datalink serves to provide authentication and access control for the WPT in static and dynamic charging scenarios. Additionally, the datalink may be used to provide information, software updates, diagnostic or telemetry information and passenger entertainment services between the GA and VA. The continuous nature of the duplex datalink results in faster feedback for control systems such as deactivation of the charging signal after the detection of foreign material being introduced between the VA and GA. The location of the communications system receivers on the physical periphery of the charging coil also allows earliest detection of an introduced obstruction.

Dynamic Case

In an embodiment of the dynamic charging case, the communications link is maintained as the vehicle moves down an equipped railway or highway. In this deployment, using the ICCS enabled with Direct Sequence Spreading System (DSSS), code sequences are selected to be as short and as orthogonal as possible with adjacent GAs allowing for fast soft-handoff between GAs. Using the magnetic induction communications link, the expected sequence of GAs and associated code sequences may be uploaded to the vehicle to increase allowable velocity on a GA-equipped travel lane or railway. Using the uploaded sequence, the ICCS may be preloaded to demodulate and decode the communications signal faster.

Figure 14:
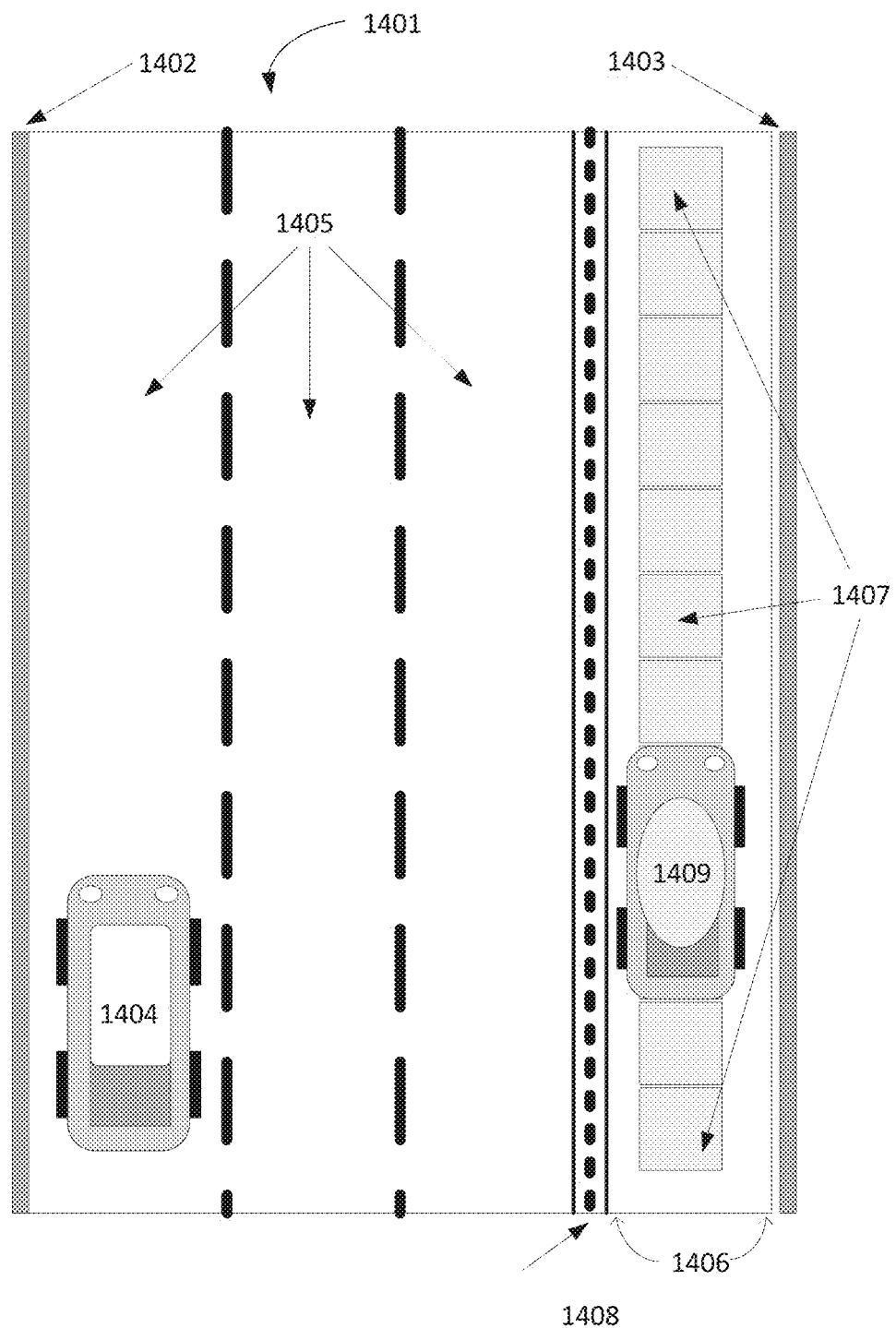
FIG. 14 illustrates an example of a highway enabled for dynamic charging in sample embodiments.

FIG. 14 illustrates one example of highway 1401 enabled for dynamic charging. The highway is set between two curbs 1402 and 1403 and divided into travel lanes 1405 and a charging lane 1406. These charging lanes may have set speeds and set inter-vehicle gap lengths to better optimize charging. The charging lane speed is set to manage charging time (aka dwell time) on each sequential GA 1407. Vehicles 1404 and 1409 may move into the charging lane, shown here with distinct lane markings or physical separation 1408, either at will or at designated entry points.

In a railway example, a sequence or array (sequential clusters) of GAs for charging VA-equipped railcars is placed between the tracks (up to one gauge wide). The GAs also could be facing VAs deployed on the side(s) or on top of the railcar.

By having a plurality of GAs arrayed in sequence along a travel path, customization of the GA may be deployed such as longer antenna (both charging and communications) and providing autonomous vehicle control information for optimal charging both at the present lane and potential charger sites along potential routes.

Independent Communications Paths per Assembly

In one embodiment, a full duplex inductively coupled datalink is deployed for each member of a cluster of independent GAs (a macro GA). Similarly, each independent VA (part of a macro-VA cluster) is equipped with a full duplex inductively coupled datalink.

This independent operation of datalinks gives the lowest latency communications by removing the circuitry and processing needed to coordinate communications between assemblies when assemblies are clustered. The lack of coordination also means the link initiation is faster since concurrent datalink setup by each assembly pair (GA-to-VA) is enabled.

The independent datalinks also ease deployment of single and multiple assemblies. Geometrically arbitrary clusters of GAs are deployable in whatever area or patterns are needed to support vehicle dimensions and scale power supply needs.

By making each VA and GA functionally identical (e.g. with identical magnetic induction antenna and a common resonant induction coil unit), economies of scale may be realized. The common resonant induction coil unit also serves to increase efficiency of the charging signal and thus the power efficiency of the ICCS as a whole.

The independent nature of the paired GA-to-VA configuration means that a single GA or VA failure in a clustered deployment is a graceful degradation to a lower charging state via the remaining GA-VA pairs. In one aspect, the failure of a VA unit results in the immediate cut-off of the charging signal from the paired GA. Since this GA is no longer radiating, the vehicle is not subject to heating from a no-longer terminated charging signal.

Those skilled in the art will appreciate that the topology and circuit implementation methodology described herein enables effective realization as a single application specific integrated circuit, discrete integrated circuits, multichip modules, and/or as software executed on a digital signal processing circuit with ancillary A/D and D/A circuitry. Further, while the disclosure contained herein pertains to the provision of electrical power to vehicles, it should be understood that this is only one of many possible applications, and other embodiments including non-vehicular applications are possible. For example, those skilled in the art will appreciate that there are numerous applications of providing a full duplex data link in non-vehicle inductive charging applications such as portable consumer electronic device chargers, such as those (e.g., PowerMat™) used to charge toothbrushes, cellular telephones, and other devices. In addition, those skilled in the art will appreciate that the transmission bandwidth (data rate) of the communications system described herein may be increased using simultaneous amplitude and angle modulation using other complex modulation methods and by use of multiple modulated forward and reverse path carriers. Accordingly, these and other such applications are included within the scope of the following claims.

What is claimed:

1. A charging system comprising:
   a first coil assembly comprising a charging coil and a first full duplex inductively coupled data communications system comprising a first transmit/receive system that transmits a first signal over a first inductive link and receives a second signal over a second inductive link; and
   a second coil assembly comprising a charging coil and a second full duplex inductively coupled data communication system comprising a second transmit/receive system that receives the first signal over the first inductive link and transmits the second signal over the second inductive link,
   wherein the first and second transmit/receive systems are adapted to be selectable among at least one of hardware, software, or firmware configurations that are adapted to modulate output signals and to demodulate input signals, and
   wherein the charging coil of the first coil assembly is configured to be disposed in parallel to the charging coil of the second coil assembly to receive a charging signal during charging and is selectively enabled to match a geometry of the second coil assembly during charging.

2. A charging system as in claim 1, wherein the first transmit/receive system comprises a processor that processes data from at least one of the first coil assembly or external systems for transmission to the second coil assembly and processes data received from the second coil assembly for delivery to at least one of the first coil assembly or the external systems for processing.

3. A charging system as in claim 2, wherein when a failure event is detected by the first coil assembly or received from the second coil assembly, the processor disables the charging signal.

4. A charging system as in claim 1, wherein the second transmit/receive system comprises a processor that processes at least one of commands or data from at least one of the second coil assembly or external systems for transmission to the first coil assembly and processes data received from the first coil assembly for delivery to at least one of the second coil assembly or at least one of the external systems.

5. A charging system as in claim 4, wherein the second coil assembly further comprises a digital interface, and the processor provides measurements related to the first signal, the second signal, and the charging signal to the digital interface.

6. A charging system as in claim 5, wherein the measurements include at least one of signal strength, bit-error-rate, ratio of Energy per Bit to a Spectral Noise Density, frequency, or amplitude and phase shift at first and second antenna structures of the first coil assembly and second coil assembly.

7. A charging system as in claim 6, wherein the external systems comprise an external processor, wherein the measurements are delivered via the digital interface to the external processor for at least one of alignment detection or closed loop charging system management and control.

8. A charging system as in claim 7, wherein the external processor provides at least one of near real-time voltage and current measurements of the second coil assembly, thermal measurements of the second coil assembly, Z-gap changes, first coil assembly or second coil assembly failure alerts, alerts regarding mid-charging performance events, or additional sensing data related to the second coil assembly to the processor for transmission.

9. A charging system as in claim 1, wherein the first signal and the second signal are configured as either narrowband or wideband signals depending on a stage of a charging cycle or whether a threshold of signal quality has been crossed.

10. A charging system as in claim 1, wherein the first signal and the second signal are configured as an asynchronous spread spectrum signal.

11. A charging system as in claim 10, wherein the first and second transmit and receive systems each comprise a direct sequence spread spectrum system that transmits code sequences that allow for the first and second transmit/receive systems to distinguish between signals and co-channel interference.

12. A charging system as in claim 11, wherein the code sequences are complementary code sequences.

13. A charging system as in claim 1, wherein the at least one of hardware, software, or firmware are adapted to modulate the output signals using at least two of amplitude modulation, phase modulation, frequency modulation, Orthogonal Frequency Division Multiplexing (OFDM), or spread spectrum techniques.

14. A charging system as in claim 13, wherein the spread spectrum techniques comprise at least one of direct sequence spread spectrum, Chirp Spread Spectrum (CSS), binary orthogonal keying (BOK), or frequency hopping.

15. A charging system as in claim 1, wherein the first and second transmit/receive systems each comprises a receiver, an analog to digital converter, a digital processor that processes data from at least one of the first coil assembly or external systems for transmission to the second coil assembly and processes data received from the second coil assembly for delivery to at least one of the first coil assembly and the external systems for processing, a digital to analog converter, or a transmitter.

16. A charging system as in claim 15, wherein the analog to digital converter and digital to analog converter are implemented as discrete integrated circuits and the digital processor is implemented as a field programmable gate array.

17. A charging system as in claim 15, wherein the analog to digital converter, digital processor, and digital to analog converter are implemented as firmware residing in an application-specific-integrated-circuit (ASIC).

18. A charging system as in claim 15, wherein the digital processor of each transmit/receive system processes input data for transmission and processes data received from the other transmit/receive system using software structures implemented on the digital processor.

19. A charging system as in claim 15, wherein the first and second transmit/receive systems each further comprises at least one bandpass filter.

20. A method of charging a vehicle comprising:
positioning a vehicle assembly with respect to a ground assembly so as to receive a charging signal, the vehicle assembly comprising one or more charging coils, with each charging coil having a first full duplex inductively coupled data communication system comprising a first transmit/receive system that receives a first signal over a first inductive link and transmits a second signal over a second inductive link, and the ground assembly comprising one or more charging coils, with each charging coil having a second full duplex inductively coupled data communications system comprising a second transmit/receive system that transmits the first signal over the first inductive link and receives the second signal over the second inductive link;
selectively enabling the charging coils of the ground assembly and the vehicle assembly based on geometric positioning of the vehicle assembly relative to the ground assembly for charging; and
communicating charging management and control data between the first and second transmit/receive systems over the first and second inductive links during charging.

21. A method as in claim 20, further comprising configuring the first transmit/receive system and the second transmit/receive system to have a same type of at least one of hardware, software, or firmware adapted to modulate the output signals using at least two of amplitude modulation, phase modulation, frequency modulation, Orthogonal Frequency Division Multiplexing (OFDM), or spread spectrum techniques.

22. A method as in claim 21, wherein the spread spectrum techniques comprise at least one of direct sequence spread spectrum, Chirp Spread Spectrum (CSS), binary orthogonal keying (BOK), or frequency hopping.

23. A method as in claim 20, further comprising communicating at least one of software updates, diagnostic or telemetry information, or passenger entertainment services data between the ground assembly and the vehicle assembly via the first and second inductive links during charging.

24. A method as in claim 20, further comprising disabling the charging signal when a failure event is detected by the ground assembly or received from the vehicle assembly.

25. A method as in claim 20, further comprising the first transmit/receive system processing at least one of commands or data from at least one of the vehicle assembly or from external systems for transmission to the ground assembly and processing data received from the ground assembly for delivery to at least one of the vehicle assembly or at least one of the external systems.

26. A method as in claim 25, further comprising providing measurements related to the first signal, the second signal, and the charging signal to a digital interface for processing.

27. A method as in claim 26, wherein the measurements include at least one of signal strength, ratio of Energy per Bit to a Spectral Noise Density, frequency, or amplitude and phase shift at first and second antenna structures of the vehicle assembly and ground assembly.

28. A method as in claim 27, further comprising delivering the measurements via the digital interface to an external processor for at least one of alignment detection or closed loop charging system management and control.

29. A method as in claim 28, further comprising transmitting at least one of near real-time voltage and current measurements on the vehicle assembly, thermal measurements of the vehicle assembly, Z-gap changes due to loading or unloading of a vehicle containing the vehicle assembly, ground assembly or vehicle assembly failure alerts, alerts regarding mid-charging performance events, or additional sensing data related to the vehicle assembly from the vehicle assembly to the ground assembly.

30. A method as in claim 20, further comprising configuring the first signal and the second signal as either narrowband or wideband signals depending on a stage of a charging cycle or whether a threshold of signal quality has been crossed.

31. A method as in claim 20, further comprising configuring the first signal and the second signal as an asynchronous spread spectrum signal.

32. A method as in claim 31, further comprising transmitting code sequences between the first and second transmit/receive systems that allow for the first and second transmit/receive systems to distinguish between signals and co-channel interference.

33. A method as in claim 32, wherein transmitting the code sequences comprises transmitting complementary code sequences.

* * * * *